United States Patent
Kumar et al.

(10) Patent No.: US 12,254,006 B2
(45) Date of Patent: *Mar. 18, 2025

(54) INTEGRATIVE CONFIGURATION FOR BOT BEHAVIOR AND DATABASE BEHAVIOR

(71) Applicant: Oracle International Corporation, Redwood Shores, CA (US)

(72) Inventors: Tarun Kumar, Bangalore (IN); Pravas Sudhakar Naik Bhagat, Bangalore (IN); Manuel Humberto Noriega Soto, Mexico City (MX); Krishna Kumar Viswanathan Nair, Ezhamkulam (IN); Vishwanagendran Venkatasubramanian, Bangalore (IN); Sankaranarayanan Nurani Raman, Bangalore (IN); Lourdes Hernández Fernández Del Castillo, Mexico City (MX); Gustavo Takano, Juriquilla (MX)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,812

(22) Filed: Feb. 2, 2024

(65) Prior Publication Data

US 2024/0176779 A1 May 30, 2024

Related U.S. Application Data

(63) Continuation of application No. 17/405,415, filed on Aug. 18, 2021, now Pat. No. 11,928,109.

(51) Int. Cl.
G06F 16/242 (2019.01)
G06F 9/54 (2006.01)

(52) U.S. Cl.
CPC ............ *G06F 16/2448* (2019.01); *G06F 9/54* (2013.01)

(58) Field of Classification Search
CPC .............................. G06F 16/2448; G06F 9/24
See application file for complete search history.

(56) References Cited

U.S. PATENT DOCUMENTS

| 9,875,440 | B1 | 1/2018 | Commons |
| 10,229,202 | B2 | 3/2019 | Li et al. |

(Continued)

OTHER PUBLICATIONS

"Bot Framework Rest APIs," accessed at https://docs.microsoft.com/en-us/azure/bot-service/rest-api/bot-framework-rest-overview?view=azure-bot-service-4.0, Feb. 20, 2021, pp. 2.

(Continued)

*Primary Examiner* — William Spieler
(74) *Attorney, Agent, or Firm* — Invoke

(57) ABSTRACT

Routines are used to connect bot queries entered via a bot interface and database queries executed on a database. Each routine is associated with routine configurations, including (a) query attributes associated with bot queries that trigger the routine, (2) a database query executed or to be executed for the routine, and/or (3) display settings for displaying information returned from the database query in a bot response. Each routine is configured to generate an output structured data object (SDO) indicating information returned from the database query and the display settings applicable to the information. The output SDOs from the various routines are transmitted to the bot application via a single API endpoint. The routine configurations are entered by a design user through one or more design user interfaces rendered by an integrative configuration application module.

20 Claims, 20 Drawing Sheets

(56) References Cited

U.S. PATENT DOCUMENTS

| | | |
|---|---|---|
| 11,550,786 B1 | 1/2023 | Naganathan et al. |
| 2018/0131645 A1 | 5/2018 | Magliozzi et al. |
| 2018/0329880 A1 | 11/2018 | Galitsky |
| 2018/0329993 A1 | 11/2018 | Bedadala et al. |
| 2019/0019077 A1 | 1/2019 | Griffin et al. |
| 2019/0042988 A1 | 2/2019 | Brown et al. |
| 2019/0121801 A1 | 4/2019 | Jethwa et al. |
| 2019/0155945 A1 | 5/2019 | Zhelezniak et al. |
| 2019/0377605 A1 | 12/2019 | Joseph |
| 2020/0341970 A1 | 10/2020 | Rodrigues |
| 2020/0374244 A1 | 11/2020 | John et al. |
| 2020/0387550 A1 | 12/2020 | Cappetta et al. |
| 2021/0303555 A1 | 9/2021 | Kim et al. |
| 2022/0067037 A1 | 3/2022 | Ranganathan et al. |
| 2022/0156823 A1 | 5/2022 | Tremblay et al. |

OTHER PUBLICATIONS

"Direct Line App Service Extension," accessed at https://docs.microsoft.com/en-us/azure/bot-service/bot-service-channel-directline-extension?view=azure-bot-service-4.0, accessed on Mar. 22, 2021, pp. 2.

"Modify a basic bot to process dynamic data," accessed at https://docs.automationanywhere.com/bundle/enterprise-v11.3/page/enterprise/topics/aae-client/bot-creator/build-basic-bot/modify-bot-to-process-dynamic-data.html, May 18, 2020, pp. 3.

Ajmera, S., "Bringing your Chatfuel Chatbot to life withBringing withDynamic ContentDynamic Content," accessed at https://chatbotslife.com/bringing-your-chatfuel-chatbot-to-life-with-dynamic-content-e661889ea2a2, Mar. 5, 2018, pp. 4.

Edgar, "JSON API the JSON API plugin enables you to integrate your backend into your chat bots onChatfuel," https://docs.chatfuel.com/en/articles/735122-json-api, accessed on Mar. 22, 2021, pp. 18.

Godse, N.A., et al., "Implementation of Chatbot for ITSM Application using IBM Watson," Fourth International Conference on Computing Communication Control and Automation (ICCUBEA), IEEE, Aug. 16-18, 2018, pp. 5.

Maguire, J., "Integrating Bot Framework Composer and Adaptive Dialog to create dynamic, user-configurable chatbots," accessed at https://jamiemaguire.net/index.php/2020/02/29/integrating-bot-framework-composer-and-adaptive-dialog-to-create-dynamic-user-configurable-chatbots/, accessed on Mar. 22, 2021, pp. 42.

Result from Database Query
400

| LABEL | VALUE |
|---|---|
| Name | John Doe |
| Country | USA |
| Earning Types #Iterative | Regular earnings, bonus |
| Earning Types Values #Iterative | 45000, 10000 |
| Start Date | January 1, 2020 |
| End Date | January 1, 2021 |

Iterative label-value pair 402a → (Earning Types row)
Iterative label-value pair 402b → (Earning Types Values row)

Sub-value 404a
Sub-value 404b
Sub-value 404c
Sub-value 404d

Chatbot Application Setup
Application ID  GPCore
*Description  Global Payroll Core          Country  ALL
                                Parent Application ID

Chatbot Module Configuration     Interface Element 1002

Module Details

| Module Name | Banking |
| Description | Banking |
| *Status | Active |
| Message Set Number | 17001 |
| Root Package ID | GP_CB_MODULE_DTL |
| App Package Path | . |
| Class Name | GP_CB_Banking |

Routines 1004                                Interface Element 1006

Routine Details

| | Routine ID | Description | Action Type | Parent ID | Method Name | Configure |
|---|---|---|---|---|---|---|
| 1 | EditBankAcct | Edit Bank Account | Display | | | Configure |
| 2 | ViewBankAcct | View Bank Account | Display | MaskAccNo | | Configure |
| 3 | ViewPayDist | View Payment Distribution | Display | | | Configure |
| 4 | MaskAccNo | Mask Account Numer | PeopleCode | | maskAcctNo | |

Save  Return to Search  Previous in List  Next in List  Notify              Add  Update/Display Design Interface 1000

FIG. 11

Design Interface 1100

Routine ID  CategoryTp
Action Type  Display  Message Set Number  17001  Interface Element 1105
Interface Element  Interface Element
1102  1104

Record Selection

| Layout Type | Source Type | View Name | Group By Column |
|---|---|---|---|
| 1 | Card ⌄ | View ⌄ | GP_ERDD_CAT_VW 🔍 | PYMT_DT 🔍 | - |

Card Layout Details

Layout  Horizontal ⌄ — Interface Element 1106
Bot Message  Message Catalog ⌄ — Interface Element 1108
Bot Message Number  2 🔍 — Interface Element 1110
Title Type  Field ⌄    Field Name  DESCR 🔍

Interface Elements 1112
| Conditions | Display Options | ⇒

▼ Layout Details — Interface Elements 1114

| 🔲 🔍 | | | | | | ◁ ◁ 1-15 of 15 ▷ ▷| |
|---|---|---|---|---|---|---|---|
| Sequence | Control Type | Field Name | Label Type | Message Number | Override Label | Display | |
| 1 | Line ⌄ | PYMT_DT 🔍 | Long ⌄ | | | ☐ | + | - |
| 11 | Line ⌄ | EMPLID 🔍 | Long ⌄ | | | ☐ | + | - |
| 21 | Line ⌄ | EMPL_RCD 🔍 | Long ⌄ | | | ☐ | + | - |
| 31 | Message ⌄ | | Long ⌄ | 12 🔍 | | ☐ | + | - |
| 41 | Line ⌄ | DESCR 🔍 | Long ⌄ | | | ☑ | + | - |
| 51 | Line ⌄ | PRD_BGN_DT 🔍 | Message ⌄ | 13 🔍 | | ☑ | + | - |
| 61 | Line ⌄ | PRD_END_DT 🔍 | Message ⌄ | 14 🔍 | | ☑ | + | - |

Interface Elements 1116
Interface Elements 1118
Interface Elements 1120
Interface Elements 1122
Interface Elements 1124

FIG. 14

Design Interface 1400

▼ Layout Details

| Data Source | ODA Conditions | Display Options |

Interface Element 1402

| Sequence | Control Type | Field Name | Label Type | Message Number | Override Label | Display Label | Display Label Bold | Display Value | Display Value Bold | Ending Text | Iterative Field | New Line | + | - |
|---|---|---|---|---|---|---|---|---|---|---|---|---|---|---|
| 1 | Line | PYMT_DT | Long | | | | | | | | | | + | - |
| 11 | Line | EMPLID | Long | | | | | | | | | | + | - |
| 21 | Line | EMPL_RCD | Long | | | | | | | | | ☒ | + | - |
| 31 | Message | | Long | 12 | | | ☐ | ☒ | ☐ | | ☐ | ☒ | + | - |
| 41 | Line | DESCR | Message | 13 | | ☒ | ☒ | ☒ | ☒ | | ☐ | ☒ | + | - |
| 51 | Line | PRD_BGN_DT | Message | 14 | | ☒ | ☐ | ☒ | ☐ | | ☐ | ☒ | + | - |
| 61 | Line | PRD_END_DT | Message | 15 | | ☒ | | | | | | | + | - |
| 71 | Line | GP_CATGRY_TY | Message | | | ☒ | ☐ | ☒ | ☐ | | ☒ | ☒ | + | - |
| 81 | Text | | | | ⬭ | | | | | | | | + | - |
| 91 | Line | JOBTITLE | Long | | | | | | | | | ☐ | + | - |
| 101 | Text | | | | ⬭ | | | | | | | | + | - |
| 111 | Start Columns | | | | | | | | | | | | + | - |
| 121 | Line | DESCR1 | Long | | | ☐ | ☐ | ☒ | ☒ | | ☒ | ☒ | + | - |
| 131 | Line | CALC_RSLT_VAL | Long | | | ☐ | ☐ | ☐ | ☐ | | ☐ | ☐ | + | - |
| 141 | End Columns | | | | | | | | | | | ☒ | + | - |

◁◁ ◁ [1-15 of 15] ▷ ▷▷

Interface Elements 1414
Interface Elements 1416
Interface Elements 1418
Interface Elements 1422
Interface Elements 1424
Interface Elements 1426
Interface Elements 1428
Interface Elements 1430
Interface Elements 1432
Interface Elements 1434

INTEGRATIVE CONFIGURATION FOR BOT BEHAVIOR AND DATABASE BEHAVIOR

INCORPORATION BY REFERENCE; DISCLAIMER

Each of the following applications are hereby incorporated by reference: application Ser. No. 17/405,415, filed on Aug. 18, 2021. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to bot applications. In particular, the present disclosure relates to integrative configuration for bot behavior and database behavior.

BACKGROUND

Bot applications are configured to render bot interfaces that aim to interact naturally with end users. Bot applications conduct natural language communications with end users through bot interfaces. Bot applications rely on various software technologies, including but not limited to natural language processing (NLP) and machine learning.

Bot interfaces (also referred to as "conversational interfaces") generally have a format similar to interfaces for messaging applications. The two sides (left and right) of a bot interface represent an end user and a bot application, respectively. User input entered from the end user appears in text bubbles on the end user side of the bot interface. Information presented from the bot application appears in text bubbles on the bot application side. Hence, the end user experiences a "virtual chat" with the bot application.

Bot applications are generally standalone front-end applications that connect with back-end applications, but are developed independently from back-end applications. Front-end applications are configured to render user interfaces, including interface elements. Back-end applications are configured to perform business logic, manage data, and/or access resources such as databases, file servers, and cloud services. A front-end application and a back-end application communicate through one or more endpoints available in an application programming interface (API). An API endpoint accepts a call from the front-end application. The API endpoint thereby triggers a routine, corresponding to the call, on the back-end application. Generally, different API endpoints are called for triggering different routines. Each API point is associated with a different address, such as a different Hypertext Transfer Protocol (HTTP) address. Hence, to connect a front-end application and a back-end application, an API needs to be configured to provide API endpoints; the front-end application needs to be configured to make appropriate calls to given API endpoints; and the back-end application needs to be configured to perform various routines responsive to given calls by the front-end application.

Managing the coordination between the API, bot application, and database application can be a complex task. Even a general task that has minor differences in different contexts may require different API points, different front-end application calls, and different back-end routines. For example, a bot query requesting a user's salary history may be relevant for users in different jurisdictions; however different jurisdictions may require different types of information to be included in a response to a salary history request. In order to accommodate the different requirements, a different set of API points, front-end application calls, and back-end routines may be necessary for each jurisdiction. Moreover, every change to the types of information returned responsive to a bot query may require corresponding modifications to the API, bot application, and database application. Changes to the types of information returned responsive to a bot query may be frequent due to external factors, such as changes in jurisdictional requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example result returned from a database query on a database in accordance with one or more embodiments;

FIG. 10 illustrates an example user interface for setting routines of a bot module in accordance with one or more embodiments;

FIG. 11 illustrates an example user interface for configuring a routine in accordance with one or more embodiments;

FIG. 14 illustrates an example user interface for configuring detailed display settings for a routine in accordance with one or more embodiments;

DETAILED DESCRIPTION

Figure 1:
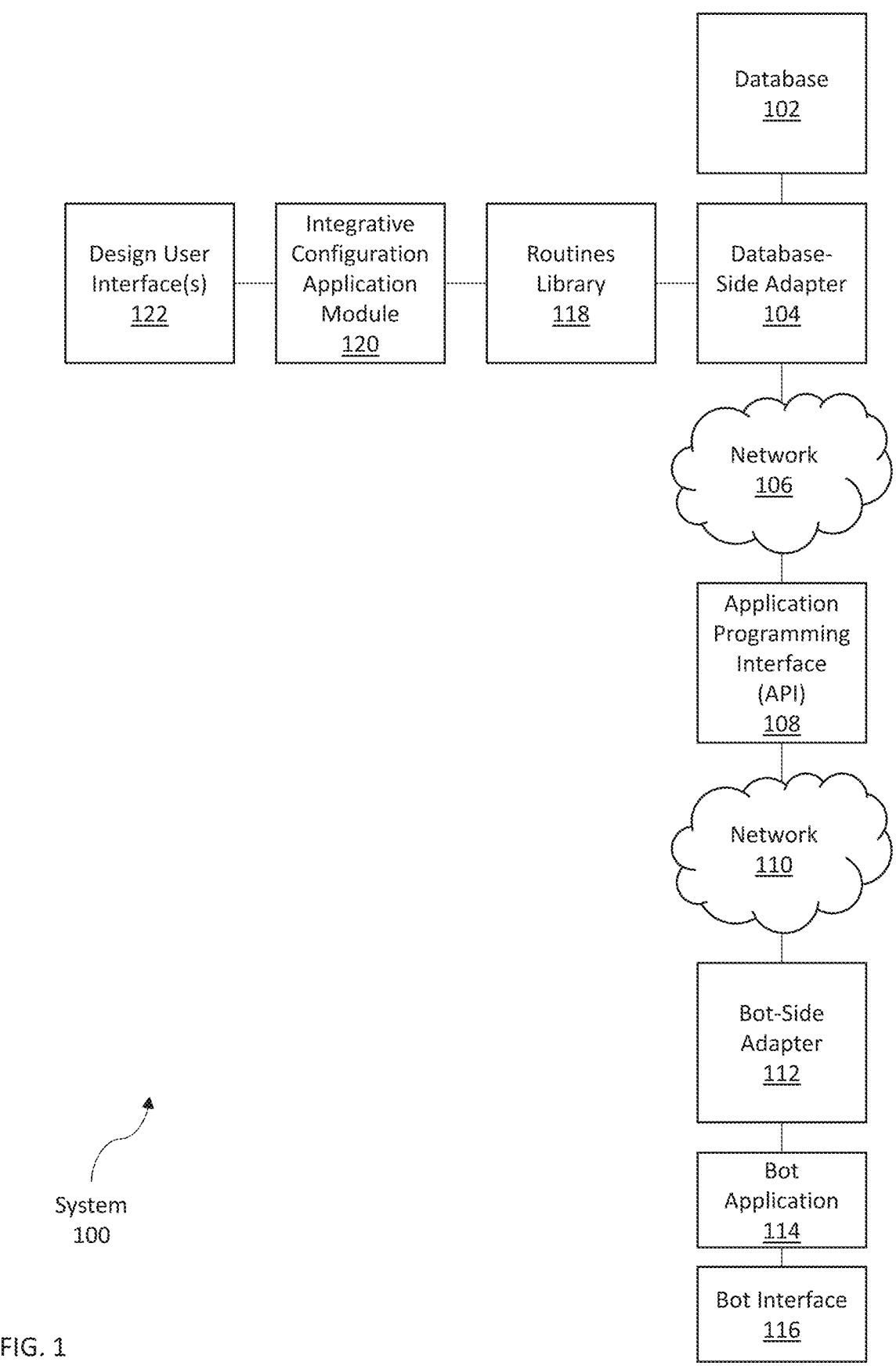
FIG. 1 illustrates an integrative configuration system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. INTEGRATIVE CONFIGURATION SYSTEM ARCHITECTURE
3. PROCESS FLOWS FOR BOT SIDE, APPLICATION PROGRAMMING INTERFACE, AND DATABASE SIDE
4. RESULT FROM DATABASE QUERY
5. GENERATING, IN RESPONSE TO A BOT QUERY, AN OUTPUT STRUCTURED DATA OBJECT INDICATING A RESULT RETURNED FROM A DATABASE QUERY
6. APPLYING VARIOUS TYPES OF DISPLAY SETTINGS
7. APPLYING PARENT ROUTINE CONFIGURATIONS TO A CHILD ROUTINE
8. RENDERING ONE OR MORE USER INTERFACES CONFIGURED TO RECEIVE ROUTINE CONFIGURATIONS
9. EXAMPLE EMBODIMENTS
10. COMPUTER NETWORKS AND CLOUD NETWORKS
11. HARDWARE OVERVIEW
12. MISCELLANEOUS; EXTENSIONS

1. General Overview

One or more embodiments include generating a plurality of routines configured to transmit respective output structured data objects (SDOs) indicating information returned from respective database queries to a bot application via a particular endpoint of an application programming interface (API). A bot-side adapter is attached and/or implemented on a bot application. The bot-side adapter packages query attributes associated with a bot query entered through a bot interface into an input SDO. The bot-side adapter transmits the input SDO to the particular API endpoint. Additionally, a database-side adapter is attached and/or implemented on a database. The database-side adapter receives the input SDO from the particular ADI endpoint. The database-side adapter identifies an appropriate routine, from a pool of routines, based on the query attributes. The appropriate routine causes performance of an appropriate database query on the database. The database-side adapter returns an output SDO, including at least a subset of the information returned from the appropriate database query. The database-side adapter transmits the output SDO to the particular API endpoint. The bot-side adapter causes display of a response to the bot query on the bot interface. The same API endpoint is used for communicating bot queries of different intents and/or types. The same API endpoint is used for communicating results from different database queries on one or more databases. Hence, there is no need to develop or maintain different API points for different bot queries or different bot responses.

One or more embodiments include rendering, by an integrative configuration application module, one or more user interfaces configured to receive user input specifying routine configurations. Through an integrated set of one or more user interfaces, a design user may enter routine configurations including (a) query attributes associated with a bot query that triggers the routine, (b) a database query on a database that is executed or to be executed in association with the bot query, and/or (c) display settings for displaying at least a subset of information returned from the database query in a bot response. In an embodiment, a user interface concurrently displays interface elements configured to receive user input specifying the above routine configurations. In another embodiment, a user interface displays a navigation button configured to move between different user interfaces, each user interface is configured to receive user input specifying a respective subset of the above routine configurations. In another embodiment, a user interface displays a series of tab buttons configured to move between different tabs on a user interface; each tab is configured to receive user input specifying a respective subset of the above routine configurations. The bot application and the database are each a standalone application that is developed independently from each other. Yet the integrative configuration application module allows the bot application and the database to be configured in an integrated manner. The integrative configuration application module may be an application developed independently from the bot application and/or the database.

One or more embodiments include generating an output SDO including control points indicating display settings for displaying information returned from a database query in a bot response. In an embodiment, routine configurations for a routine indicate a conditional display setting for an information element returned from a database query. The database (and/or an associated database-side adapter) evaluates the condition to determine whether the conditional display setting is applicable. If the conditional display setting is applicable, the database generates an output SDO indicating the conditional display setting for the information element; the output SDO indicates the conditional display setting for the information element without necessarily indicating the condition. If the conditional display setting is not applicable, the database generates an output SDO that does not indicate the conditional display setting for the information element; the output SDO may indicate a different display setting for the information element.

In another embodiment, routine configurations for a routine indicate display settings for iterative label-value pairs associated with a result returned from a database query. A result returned from a database query is given in label-value pairs. An iterative label-value pair includes a value that includes multiple sub-values. A display setting configured for the value is iteratively applied to each sub-value. Where the result from a database query includes a group of iterative label-value pairs, an output SDO indicates a sequence for displaying the respective sub-values—for example, a first sub-value from each iterative label-value pair is displayed in respective rows of a table, then a next sub-value from each iterative label-value pair is displayed in the respective rows of the table, until each sub-value associated with each iterative label-value pair is displayed. Further, the output SDO indicates display settings for the respective sub-values of the iterative label-value pairs. The output SDO indicates a same display setting for each sub-value of a value.

One or more embodiments include applying routine configurations for a parent routine to as default configurations for a child routine. A bot module includes a set of routines, which may be associated with a same topic. A module profile of a bot module indicates hierarchical relationships of the bot module with respect to other bot modules. Additionally or alternatively, a routine profile of a routine indicates hierarchical relationships of the routine with respect to other routines. A particular routine of a particular bot module may be referred to as a "child" of another routine if (a) the routine profile of the particular routine indicates that the routine is a child of the other routine and/or (b) the module profile of the particular bot module indicates that the particular bot module is a "child" of another bot module, which includes the other routine. An integrative configuration application module displays, on a user interface, routine configurations for a parent routine as default configurations for a child routine. The integrative configuration application module may be configured to accept user input modifying the default configurations for the child routine. Hence, if a general task has minor differences in different context, routines for each context may be efficiently generated by copying routine configurations for a parent routine corresponding to the general task, and making customizations to the copied routine configurations.

One or more embodiments described in this Specification and/or recited in the claims may not be included in this General Overview section.

2. Integrative Configuration System Architecture

FIG. 1 illustrates an integrative configuration system in accordance with one or more embodiments. As illustrated in FIG. 1, an integrative configuration system 100 includes a database 102, a database-side adapter 104, a network 106, an application programming interface (API) 108, a network 110, a bot-side adapter 112, a bot application 114, a bot interface 116, a routines library 118, an integrative configuration application module 120, and one or more design interfaces 122. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a database 102 is an organized collection of structured information, or data, stored electronically in a computer system. Data within the most common types of databases is typically modeled in rows and columns in a series of tables to make processing and data querying efficient. The data can be easily accessed, managed, modified, updated, controlled, and organized. Most databases use structured query language (SQL) for writing and querying data. Different types of databases may be used. In a relational database, items are organized as a set of tables with columns and rows. In an object-oriented database, information is represented in the form of objects, as in object-oriented programming. In a distributed database, two or more files are located in different sites. The distributed database may be stored on multiple computers, located in the same physical location, or scattered over different networks. In a data warehouse, a central repository for data is maintained and specifically designed for fast query and analysis. In a NoSQL, or nonrelational, database, unstructured and semistructured data may be stored and manipulated (in contrast to a relational database, which defines how all data inserted into the database must be composed). In a graph database, data is stored in terms of entities and the relationships between entities. In an Online Transactional Processing (OLTP) database, data storage and access are designed for large numbers of transactions performed by multiple users. Additional types of databases include open source databases, cloud databases, multimodel databases, document/JSON databases, and self-driving databases.

In an embodiment, a database 102 includes software configured to crate, edit, and maintain data stored in the database 102. Functions of the software include for example file and record creation, data entry, data editing, updating, reporting, data backup, data recovery, multi-access control, security, and/or performance monitoring.

In an embodiment, a database 102 organizes data according to a set of labels. A label and the corresponding value may be referred to as a "label-value pair." As an example, a database may include various fields, such as "First Name," "Last Name," and "Age." One data entry may be "John," "Smith," and "36." Hence, the data entry indicates that the value "John" is associated with the label "First Name"; the value "Smith" is associated with the label "Last Name"; and the value "36" is associated with the label "Age." First Name-John may be referred to as a label-value pair; Last Name-Smith may be referred to as another label-value pair; Age-36 may be referred to as another label-value pair.

In one or more embodiments, a network (such as any of network 106, 110) includes a set of nodes connected by a set of links. The network may be a private network, a public network, and/or a hybrid network. Additional embodiments and/or examples relating to computer networks are described below in Section 10, titled "Computer Networks and Cloud Networks."

In one or more embodiments, an application programming interface (API) 108 is a software intermediary that allows two applications to communicate with each other. An API endpoint makes available a particular service of an application to another application. Each API endpoint is associated with a different address (such as an HTTP address). An API endpoint is called by transmitting a request to the address associated with the API endpoint.

An API 108 is implemented between a database 102 and a bot application 114. In an embodiment, the database 102, the bot application 114, and the API 108 are each implemented separately. The database 102, the bot application 114, and the API 108 may communicate via public networks. Hence, the bot application 114 may be required to include authenticating information in communications with the API 108. The database 102 may be required to include authenticating information in communications with the API 108.

The database 102 and the bot application 114 may be required to include authenticating information in communications with each other. Unauthenticated communications may be rejected by any receiving component.

Further details regarding APIs are described below with reference to API 208 of FIGS. 2A-2C.

In one or more embodiments, a bot application 114 refers to software and/or hardware configured to render a bot interface that aims to interact naturally with an end user. A bot application 114 conducts natural language communications with an end user through a bot interface. A bot application 114 relies on various software technologies, including natural language processing (NLP) and machine learning. Machine learning algorithms may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, a bot interface 116 is a user interface rendered by a bot application 114 to facilitate communications between an end user and the bot application 114. A bot interface (also referred to as a "conversational interface") may have a format similar to interfaces for messaging applications. The two sides (left and right) of a bot interface represent an end user and a bot application 114, respectively. User input entered from the end user appears in text bubbles on the end user side of the bot interface. Information presented from the bot application appears in text bubbles on the bot application side. Hence, the end user experiences a "virtual chat" with the bot application 114.

In an embodiment, different components of a bot interface 116 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Additionally or alternatively, a bot interface 116 is specified in one or more other languages, such as Java, C, or C++.

In one or more embodiments, a routines library 118 includes one or more routines. A routine is triggered by bot queries associated with a particular set of one or more query attributes. A routine obtains results from a particular database query to be executed or already executed on a database. A routine specifies particular display settings for displaying the results from the database query. Different routines are associated with different query attributes of bot queries. Different routines are associated with different database queries, which may be executed on the same or different databases. Different routines are associated with different display settings. Further details regarding routines are described below with reference to routines 226a-226b of FIG. 2B.

In one or more embodiments, an integrative configuration application module 120 refers to software and/or hardware configured to render one or more user interfaces configured to receive user input specifying routines and corresponding routine configurations. Examples of operations for rendering one or more user interfaces configured to receive routine configurations are described below with reference to FIG. 8. In an embodiment, an integrative configuration application module 120 is implemented on a database 102 that executes a database query responsive to a routine defined via the integrative configuration application module 120. In another embodiment, an integrative configuration application module 120 is implemented on a bot application 114 that receives a bot query triggering a routine defined via the integrative configuration application module 120. In another embodiment, an integrative configuration application module 120 is implemented separately from a database 102 and/or a bot application 114. Separate implementation refers to, for example, running on different operating systems (OS), different hardware, and/or different virtual machines or containers. Additionally or alternatively, the integrative configuration application module 120 is developed independently of a database 102 and/or a bot application 114.

In one or more embodiments, a design interface 122 is a user interface rendered by an integrative configuration application module 120 to facilitate communications between a design user and the integrative configuration application module 120. A set of one or more design interfaces 122 are rendered by the same integrative configuration application module 120 to define and/or configure a set of one or more routines. A set of one or more design interfaces 122 include interface elements configured to receive routine configurations for a routine, such as (a) query attributes associated with a bot query that triggers the routine, (b) a database query on a database that is executed or to be executed in association with the bot query, and/or (c) display settings for displaying at least a subset of information returned from the database query in a bot response.

In an embodiment, a single design interface 122 concurrently displays interface elements configured to receive user input specifying the above routine configurations. In another embodiment, each of a set of design interfaces 122 displays a navigation button configured to move between the design interfaces 122; each design interface 122 is configured to receive user input specifying a respective subset of the above routine configurations. In another embodiment, a design interface 122 displays a series of tab buttons configured to move between different tabs on the design interface 122; each tab is configured to receive user input specifying a respective subset of the above routine configurations.

In one or more embodiments, a database-side adapter 104 refers to hardware and/or software configured to facilitate communications between a database 102 and an API 108. A database-side adapter 104 may be implemented on a database 102. Alternatively, a database-side adapter 104 may be implemented separately from a database 102.

In one or more embodiments, a bot-side adapter 112 refers to hardware and/or software configured to facilitate communications between a bot application 114 and an API 108. A bot-side adapter 112 may be implemented on a bot application 114. Alternatively, a bot-side adapter 112 may be implemented separately from a bot application 114.

Further details regarding a database-side adapter and a bot-side adapter are described below with reference to database-side adapter 204 and bot-side adapter 212 of FIGS. 2A-2C.

In one or more embodiments, an integrative configuration application module 120, a database-side adapter 104, and/or a bot-side adapter 112 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

Figure 2A:
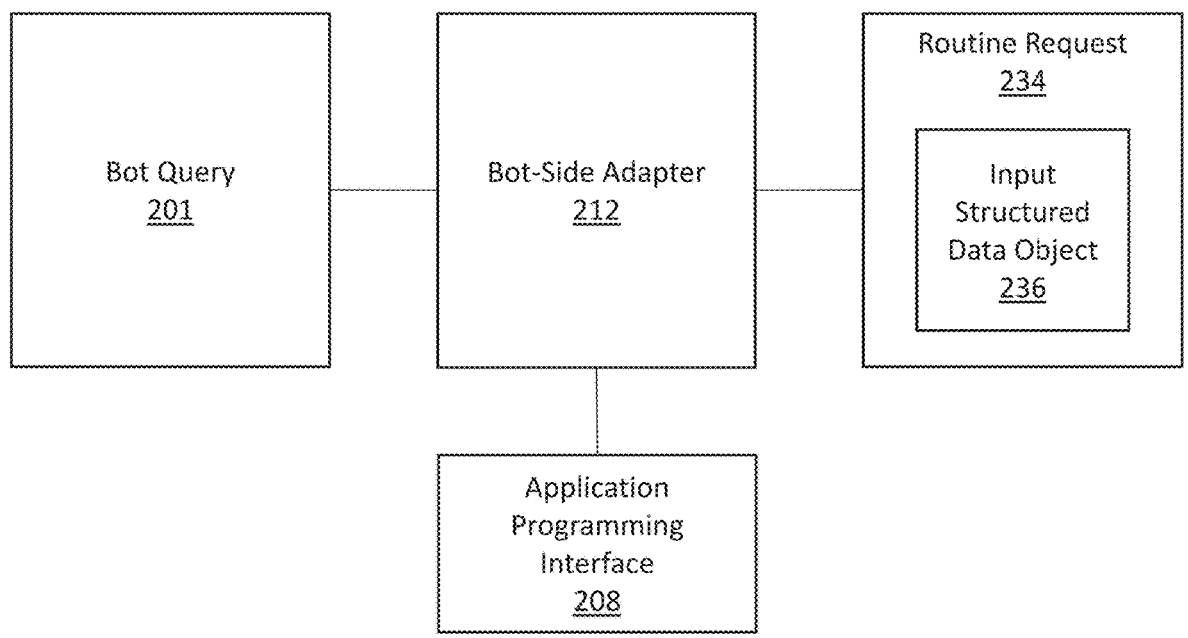
FIGS. 2A-2C illustrate a bot-side adapter and a database-side adapter in accordance with one or more embodiments.
Figure 2B:
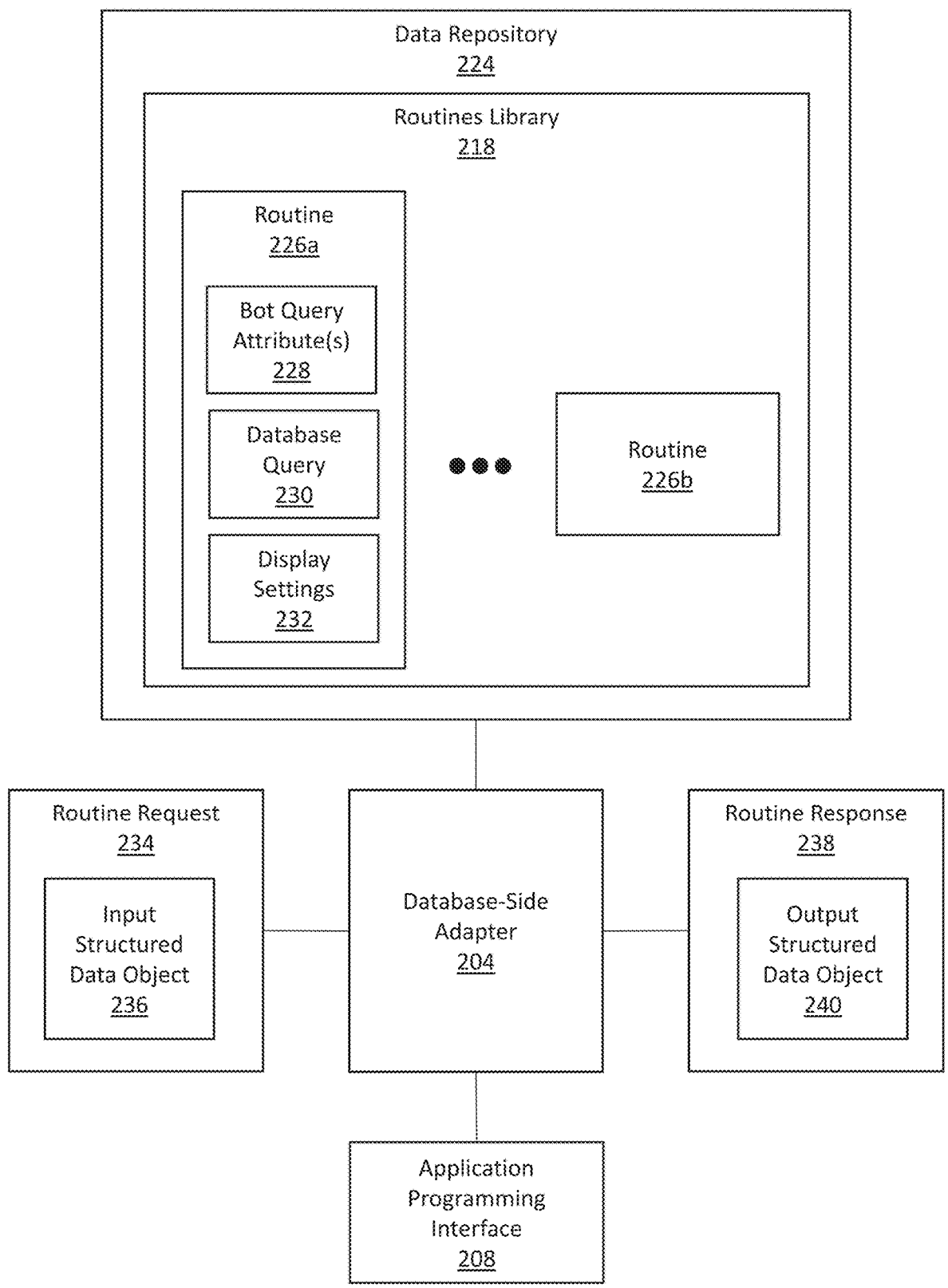
Figure 2C:
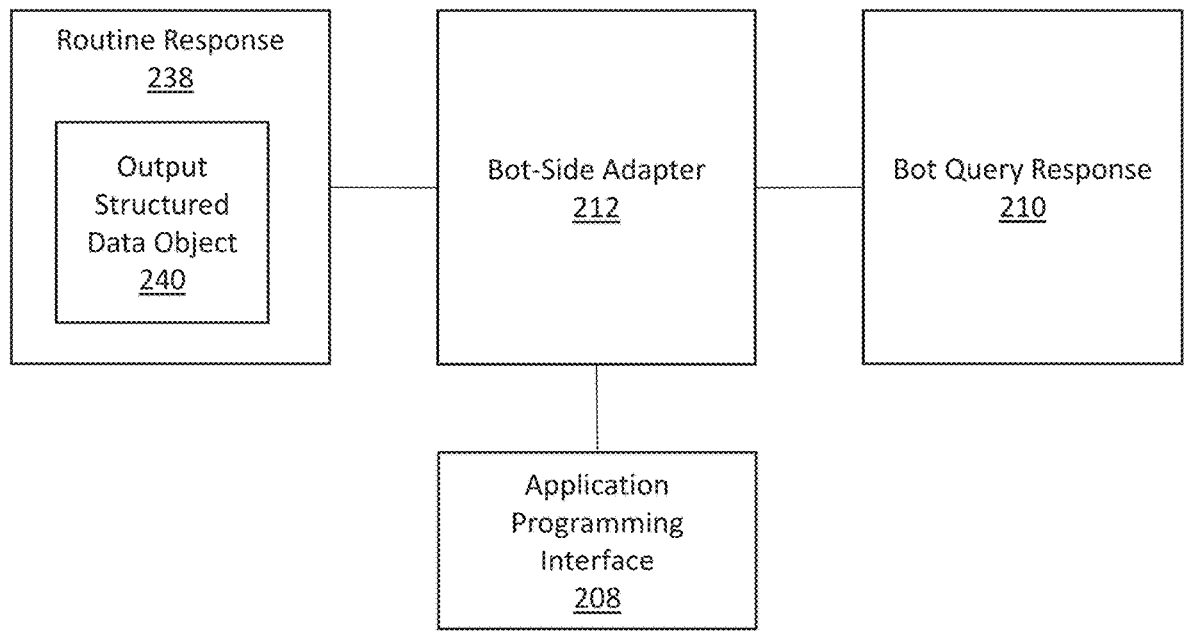

FIGS. 2A-2C illustrate a bot-side adapter and a database-side adapter in accordance with one or more embodiments.

Referring to FIG. 2A, in one or more embodiments, a bot query 201 is a natural language query entered via a bot interface. A bot query 201 does not necessarily conform to a particular query structure or format. A bot query 201 does not necessarily include particular keywords. A bot application applies natural language processing (NLP) and/or machine learning on a bot query 201 to determine an intent and/or type of the bot query 201. As an example, a bot interface for a human resources database is provided. Bot queries of different intents may be entered. The intents may include: finding a user's gross income over a time period, finding a user's deductions over a time period, finding a user's employment history over a time period.

In one or more embodiments, a routine request 234 is a request from a bot-side adapter 212 to execute a routine on a database-side adapter 204 based on a bot query 201. The routine request 234 includes an input structured data object (SDO) 236. The input SDO 236 indicates a set of query attributes associated with the bot query 201. Query attributes include, for example, an intent and/or type of the bot query 201 (which may be determined by a bot application using NLP), a source (e.g., machine, user, country, server, browser) of the bot query 201, user attributes (e.g., position, department, user identifier) of the user entering the bot query 201, and/or a timestamp (e.g., creation time, transmission time) associated with the bot query 201.

In one or more embodiments, a bot-side adapter 212 is configured to generate a routine request 234 (and input SDO 236) based on query attributes associated with a bot query 201. The bot-side adapter 212 is configured to transmit the routine request 234 (and input SDO 236) to an API 208.

In an embodiment, a bot-side adapter 212 generates routine requests 234 for bot queries 201 of different intents and/or types. The bot-side adapter 212 transmits the routine requests 234 to the same endpoint of the API 208, even though the routine requests 234 are associated with bot queries 201 of different intents and/or types.

Referring to FIG. 2B, in one or more embodiments, a data repository 224 is any type of storage unit and/or device (e.g., a file system, database, collection of tables, or any other storage mechanism) for storing data. Further, a data repository 224 may include multiple different storage units and/or devices. The multiple different storage units and/or devices may or may not be of the same type or located at the same physical site. Further, a data repository 224 may be implemented or executed on the same computing system as a database-side adapter 204. Alternatively or additionally, a data repository 224 may be implemented or executed on a computing system separate from a database-side adapter 204. The data repository 224 may be communicatively coupled to the database-side adapter 204 via a direct connection or via a network.

Information describing a routines library 218 may be implemented across any of components within the system 100 of FIG. 1. However, this information is illustrated within the data repository 224 for purposes of clarity and explanation.

As previously described, a routines library 118 includes one or more routines 226a-226b. In one or more embodiments, a routine (such as any of routines 226a-226b) is associated with one or more bot query attributes, a database query, and one or more display settings. Each of the routines 226a-226b is configured to transmit respective output SDOs 240 indicating information returned from the respective database queries to the bot application via a particular endpoint of an API 208. As illustrated, routine 226a is associated with bot query attributes 228, a database query 230, and one or more display settings 232. Routine 226a is configured to transmit an output SDO 240 indicating information returned from the database query 230 to the bot application via the particular API endpoint. Routine 226b is configured to transmit an output SDO 240 indicating information returned from a different database query (not illustrated) to the bot application via the same particular API endpoint.

In one or more embodiments, a bot query attribute 228 is an attribute associated with bot queries that would trigger routine 226a. Bot query attributes 228 include, for example, an intent and/or type of triggering bot queries, a source (e.g., machine, user, country, server, browser) of triggering bot query, user attributes (e.g., position, department, user identifier) of users entering triggering bot queries, and/or time windows (e.g., creation time, transmission time) associated with triggering bot queries. Different bot query attributes are associated with different routines. A bot query whose attributes match the bot query attributes of a particular routine trigger the particular routine. Conversely, a bot query whose attributes do not match the bot query attributes of a particular routine does not trigger the particular routine.

In one or more embodiments, a database query 230 is a query that is executed or to be executed on a database for routine 226a. Routine 226a is executed to insert at least a subset of the result returned from the database query 230 to form an output SDO 240. The database query 230 may be written in SQL, or another language and/or format. In an embodiment, routine 226a is associated with a database view. The database view is a virtual table extracted from a database based on a database query. Routine 226a is executed to insert at least a subset of the information in the database view to form an output SDO 240.

In an embodiment, a result returned from a database query 230, and/or a database view, is associated with a set of labels and a corresponding set of values. The set of labels of the result and/or database view may be the same as the labels associated with the database. As an example, a database may include various fields, such as "First Name," "Last Name," and "Age." One data entry may be "John," "Smith," and "36." A database query may request entries from the database where the value for "Age" is between "35" and "38." The result returned from the database query would include the above data entry. The result would include the label "First Name" and the corresponding value "John"; the label "Last Name" and the corresponding value "Smith"; and the label "Age" and the corresponding value "36."

In an embodiment, each routine of a routine library 218 is associated with a respective database query on one or more databases. Each routine inserts information returned from different database queries into a respective output SDO 240.

In one or more embodiments, a display setting 232 is a configuration relating to how an information element (returned from a database query 230) is displayed in a bot response on a bot interface. Information elements include the set of labels associated with the result returned from the database query 230, and the set of values (corresponding to the set of labels) associated with the result returned from the database query 230. Routine 226a is executed to generate an output SDO 240 that indicates the display settings 232 for the information elements associated with the result returned from the database query 230.

In an embodiment, a display setting 232 indicates which labels, of the labels associated with a result returned from a database query 230, to display in a bot response. For each label associated with the result returned from the database query 230, a display setting 232 indicates whether to display the label or not to display the label. Additionally or alternatively, a display setting 232 indicates which values, of the values associated with a result returned from a database query 230, to display in the bot response. For each value associated with the result returned from the database query 230, a display setting 232 indicates whether to display the value or not to display the value.

In an embodiment, a display setting 232 indicates a particular position, within the bot response, for displaying a label associated with a result returned from a database query 230. Additionally or alternatively, a display setting 232 indicates a particular position, within the bot response, for displaying a value associated with a result returned from a database query 230. As an example, a display setting may indicate a particular sequence for displaying the labels and/or values associated with a database query result in a bot response.

In an embodiment, a display setting 232 indicates a particular layout for displaying a label associated with a result returned from a database query 230 in a bot response. Additionally or alternatively, a display setting 232 indicates a particular layout for displaying a value associated with a result returned from a database query 230 in the bot response. As an example, a display setting may indicate that certain labels and/or values associated with a database query result should be displayed in a table format. The display setting may indicate which labels and/or values are inserted into which rows and/or columns of the table.

In an embodiment, a display setting 232 indicates a format for displaying a label associated with a result returned from a database query 230. Additionally or alternatively, a display setting 232 indicates a format for displaying a value associated with a result returned from a database query 230. A format may be for example bold, italics, underline, all capital letters, a particular color, and/or a particular animation (e.g., fade in, fade out).

In an embodiment, a display setting 232 is a conditional display setting associated with a particular condition. The conditional display setting is applicable to an information element if the particular condition is satisfied, but is not applicable to the information element if the particular condition is not satisfied.

In an embodiment, a display setting 232 indicates whether a label-value pair is iterative. A value of an iterative label-value pair includes multiple sub-values. Each sub-value for an iterative label-value pair is displayed in a respective row of a table in a bot response. Additionally, a display setting (e.g., position, format, layout) indicated for the value is iteratively applied to each sub-value of the value. Further details regarding iterative label-value pairs are described below with reference to FIG. 4.

In one or more embodiments, a routine response 238 is a response generated in response to a call to a routine. A routine response 238 includes an output SDO 240. An SDO may be written in any file format, such as JavaScript Object Notation (JSON), Comma-Separated Values (CSV), Extensible Markup Language (XML). An output SDO 240 includes information elements to be displayed in a bot response, and control points indicating display settings for the information elements. The output SDO 240 indicates a display setting for displaying each information element in a bot response.

As an example, an output SDO may be:

```
OutputJSON :
{
  "Layout" : "Horizontal"
  "Details" :
  {
    "Rows" : [
    {
      "Display" : "Y",
      "Iterative" : "N",
      "Description" : "Payment Date",
      "Format" : "Bold"
    },
    {
      "Display" : "Y",
      "Iterative" : "N",
      "Value" : "2020-10-01",
      "Format" : "Italics"
    }
    ],
  }
}
```

In the above example, the output SDO indicates a label to be displayed in a bot response, "Payment Date." The output SDO indicates a value to be displayed in a bot response, "2020-10-01." The output SDO includes a control point "Display": "Y", indicating whether the associated information element is to be displayed in the bot response. The output SDO includes a control point "Format": "Bold", indicating to display the associated information element in bold. The output SDO includes a control point "Format": "Italics", indicating to display the associated information element in italics.

In an embodiment, where a routine 226a is associated with a conditional display setting, the output SDO 240 does not necessarily indicate the existence of any condition. Where the condition evaluates as true, the output SDO 240 indicates that the conditional display setting applies to the information element, without indicating any conditions. Where the condition evaluates as false, the output SDO 240 does not indicate that the conditional display setting applies to the information element. If the display settings 232 indicates an alternative display setting where the condition is false, the output SDO 240 indicates that the alternative display setting applies to the information element, without any indication of the conditional display setting.

As an example, a routine may be associated with a database query returning a date value. A conditional display setting for the routine may indicate that a bold format is applied to the date value if the date value is before Jan. 1, 2010; otherwise, an underline format is applied to the date value. The routine may be called, and a result from the database query may include two entries. One entry includes the date value "Jan. 1, 2009"; the other entry includes the date value "Jan. 2, 2010." The routine determines that the date value "Jan. 1, 2009" is before Jan. 1, 2010. The routine inserts into an output SDO a control point indicating that a bold format is applied to the date value "Jan. 1, 2009." The routine determines that the date value "Jan. 2, 2010" is not before Jan. 1, 2010. The routine inserts into the output SDO a control point indicating that an underline format is applied to the date value "Jan. 2, 2010." The output SDO does not include any indication of the condition. The output SDO does not indicate the bold format for the date value "Jan. 2, 2010." The output SDO does not indicate the underline format for the date value "Jan. 1, 2009."

In one or more embodiments, a database-side adapter 204 is configured to generate an a routine response 238 (and output SDO 240) based on an input SDO 236. The database-side adapter 204 is configured to transmit the routine response 238 (and output SDO 240) to the API 208.

In an embodiment, a database-side adapter 204 generates routine responses 238 based on different database queries. The database-side adapter 204 transmits the routine responses 238 to the same endpoint of the API 208, even though the routine responses 238 are associated with different database queries. Hence, the routine requests 234 from the bot-side adapter 212 and the routine responses 238 from the database-side adapter 204 share a same API endpoint.

Referring to FIG. 2C, in one or more embodiments, a bot query response 210 is a response to a bot query displayed on a bot interface. The bot query response 210 may be provided in natural language format.

In one or more embodiments, a bot-side adapter 212 is configured to generate a bot query response 210 based on a routine response 238 (in addition to generating a routine request 234 based on query attributes associated with a bot query 201, described above with reference to FIG. 2A). The bot-side adapter 212 is configured to receive the routine response 238 from the API 208. The bot-side adapter 212 parses the output SDO 240 to generate the bot query response 210 in accordance with the display settings indicated by the output SDO 240. The bot-side adapter 212 may receive routine responses 238 from the same endpoint of the API 208, even though the routine responses 238 are associated with different database queries.

Figure 3:
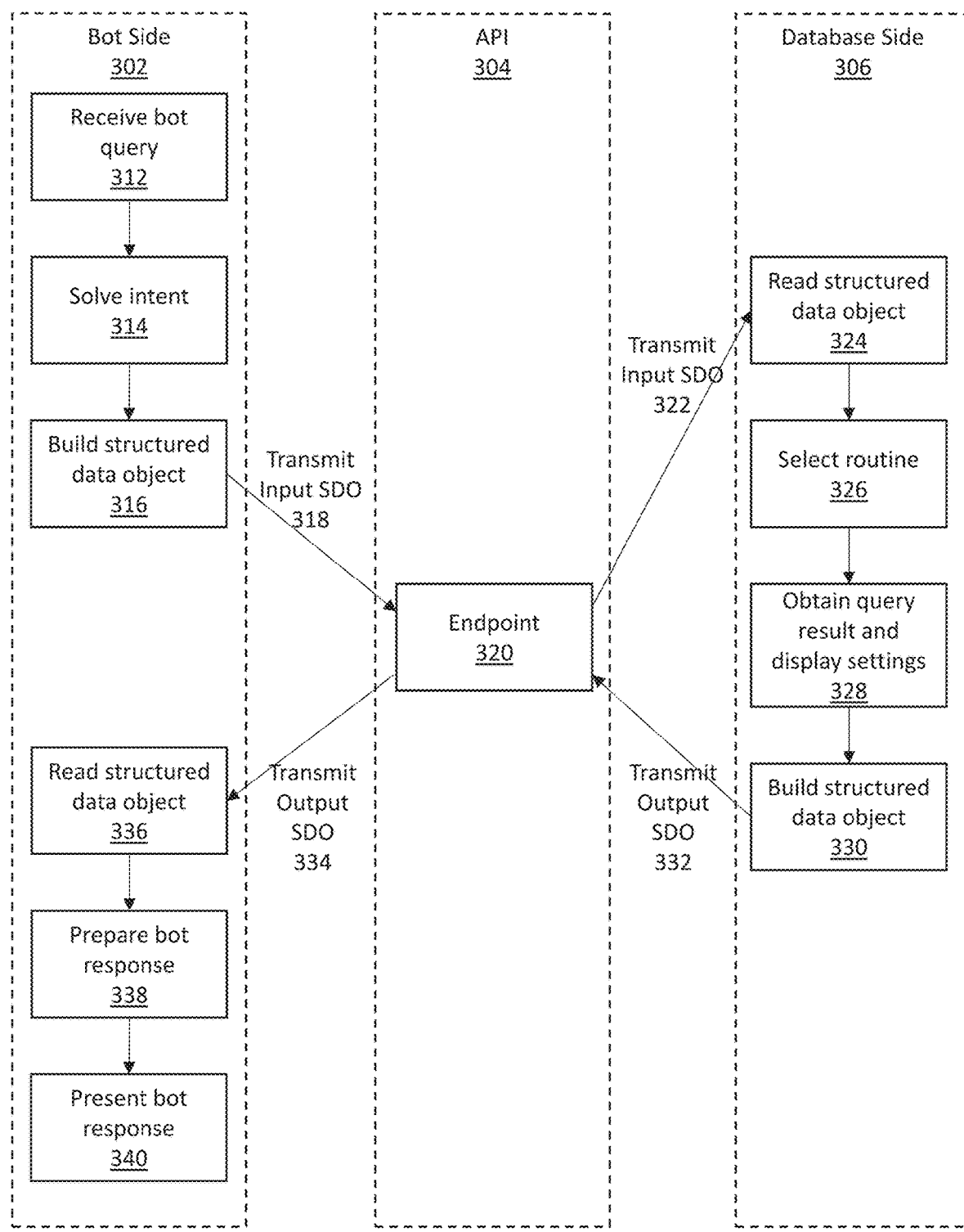
FIG. 3 illustrates process flows for a bot side, an application programming interface, and a database side in accordance with one or more embodiments.

3. Process Flows for Bot Side, Application Programming Interface, and Database Side FIG. 3 illustrates process flows for a bot side, an application programming interface, and a database side in accordance with one or more embodiments. The bot side 302 refers to a bot interface, a bot application, and/or a bot-side adapter. The database side 306 refers to a database, and/or a database-side adapter.

Initially, the bot side 302 receives a bot query (Operation 312) via a bot interface from an end user. The bot side 302 applies NLP an/or machine learning to solve an intent (Operation 314) of the bot query. The bot side 302 builds an input SDO (Operation 316). The input SDO indicates the intent of the bot query and/or other query attributes of the bot query. The bot side 302 transmits the input SDO to an endpoint 320 of the API 304 (Operation 318). The endpoint 320 transmits the input SDO to the database side 306 (Operation 322).

The database side 306 reads the input SDO (Operation 324). The database side 306 selects a routine from a routines library based on the input SDO (Operation 326). Selecting the routine includes determining whether the bot query attributes indicated in the input SDO match the bot query attributes associated with any routine of the routines library. The bot query attributes associated with each routine are routine configurations entered by a design user. The database side 306 obtains a result from the database query associated with the selected routine, and obtains display settings associated with the selected routine (Operation 328). The database query and the display settings associated with the routine are also routine configurations entered by the design user. The database side 306 builds an output SDO based on the query result and display settings (Operation 330). The output SDO indicates at least a subset of the information returned from the database query, and display settings for the subset of the information. The database side 306 transmits the output SDO to the endpoint 320 (Operation 332). The endpoint 320 transmits the output SDO to the bot side 302.

The bot side 302 reads the output SDO (Operation 336). The bot side 302 prepares a bot response based on the output SDO (Operation 338). The bot response includes the information returned from the database query indicated by the output SDO. The bot response applies the display settings indicated by the output SDO to the information. The bot side 302 presents the bot response on the bot interface to the end user (Operation 340).

4. Result from Database Query

FIG. 4 illustrates an example result returned from a database query on a database in accordance with one or more embodiments. A result 400 from a database query includes a set of labels and a corresponding set of values. The labels include, "Name," "Country," "Earning Types," "Earning Type Values," "Start Date," and "End Date." The values include, "John Doe," "USA," "Regular earnings, bonus," "45000, 10000," "Jan. 1, 2020," and "Jan. 1, 2021." As illustrated, Name-John Doe is a label-value pair, and Country-USA is another label-value pair, for example.

"Earning Types" and "Earning Type Values" are each marked with an iterative tag. An iterative tag indicates that "Earning Types" and the corresponding value is an iterative label-value pair 402a. The value corresponding to "Earning Types" includes multiple sub-values: "Regular earnings" 404a, and "bonus" 404b. The other iterative tag indicates that "Earning Type Values" and the corresponding value is an iterative label-value pair 402b. The value corresponding to "Earning Type Values" includes multiple sub-values: "45000" 404c, and "10000" 404d.

In an embodiment, creation of a database query requires specification of a set of labels associated with the result returned from the database query. Creation of a database view requires specification of a set of labels associated with the database view. By using iterative label-value pairs, a design user may use sub-values with an iterative label-value pair as "labels." As illustrated, the sub-values of "Earning Types" serve as "labels" to the sub-values of "Earning Type Values." In particular, the sub-value "regular earnings" serves as a "label" to the sub-value "45000." The sub-value "bonus" serves as a "label" to the sub-value "10000." A value of an iterative label-value pair may include any number of sub-values (within an available memory space for the value). Therefore, the names of labels and the number of labels is dynamically determined based on the actual data stored in the database. The names of labels and the number of labels need not be known at the time of creating the database query and/or database view.

In an example, routine configurations for a routine indicate that the routine is associated with the database query returning result 400. The display settings for the routine indicate that "Earning Types" is iterative, and "Earning Type Values" is iterative. The display settings for the routine further indicate that a bold format is applied to a value corresponding "Earning Types," and an underline format is applied to a value corresponding to "Earning Type Values."

Based on the routine, each sub-value for the iterative label-value pairs 402a-b is displayed in a respective row of a table in a bot response. Hence, "Regular earnings" may appear in row 1, and "45000" may appear in row 1; "bonus" may appear in row 2, and "10000" may appear in row 2.

Additionally, a display setting (e.g., position, format, layout) indicated for the value is iteratively applied to each sub-value of the value. Hence, the bold format may apply to each of "regular earnings" and "bonus"; the underline format may apply to each of "45000" and "10000." An example bot response resulting from the routine may include:

TABLE 1

| Regular earnings | 45000 |
|---|---|
| Bonus | 10000 |

5. Generating, in Response to a Bot Query, an Output Structured Data Object Indicating a Result Returned from a Database Query One or more operations illustrated in FIG. 5 may be modified, rearranged, or omitted all together. Accordingly, the particular sequence of operations illustrated in FIG. 5 should not be construed as limiting the scope of one or more embodiments.

Figure 5:
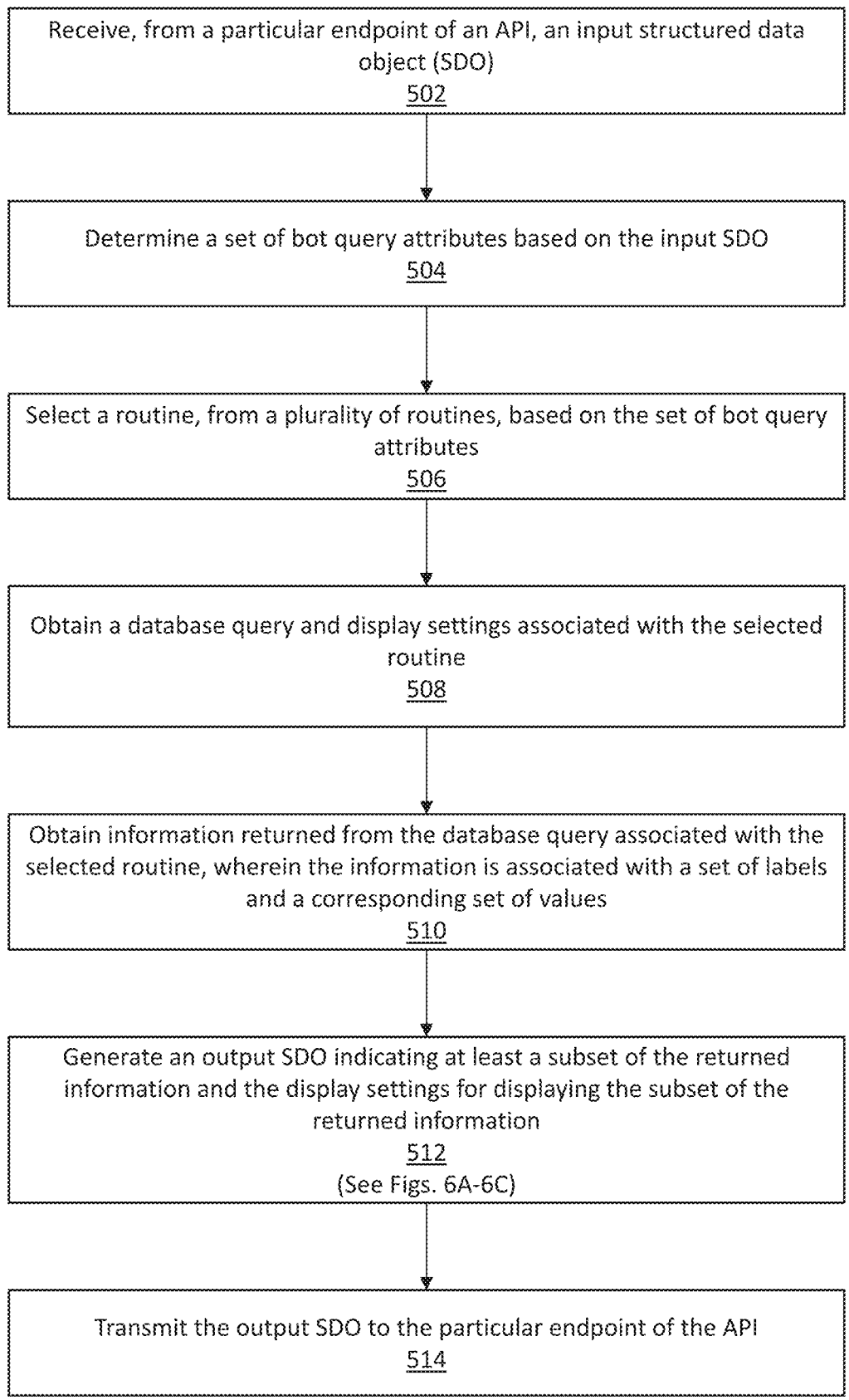
FIG. 5 illustrates an example set of operations for generating, in response to a bot query, an output structured data object (SDO) indicating a result returned from a database query.

FIG. 5 illustrates an example set of operations for generating, in response to a bot query, an output structured data object (SDO) indicating a result returned from a database query. Operations of FIG. 5 are described as being performed on a database side, which may include any of a database and/or a database-side adapter.

One or more embodiments include receiving, from a particular endpoint of an API, an input structured data object (SDO) (Operation 502). A database side receives an input SDO from a particular API endpoint. The input SDO indicates bot query attributes of a bot query.

One or more embodiments include determining a set of bot query attributes based on the input SDO (Operation 504). The database side parses the input SDO to determine the bot query attributes indicated by the input SDO.

One or more embodiments include selecting a routine, from a plurality of routines, based on the set of bot query attributes (Operation 506). The database side determines bot query attributes associated with routines of a routines library. The bot query attributes associated with the routines are routine configurations entered by a design user, which is further described below with reference to FIG. 8. The database side selects a routine, from the routines library, that has bot query attributes matching the bot query attributes indicated by the input SDO.

One or more embodiments include obtaining a database query and display settings associated with the selected routine (Operation 508). The database side obtains a database query that is executed or to be executed in association with the selected routine. The database side obtains display settings, associated with the selected routine, for displaying information returned from the database query in a bot response. The database query and display settings associated with the routine are routine configurations entered by the design user, which is further described below with reference to FIG. 8.

One or more embodiments include obtaining information returned from the database query associated with the selected routine (Operation 510). The database side obtains information returned from the database query associated with the selected routine. The information is associated with a set of labels and a corresponding set of values.

One or more embodiments include generating an output SDO indicating at least a subset of the returned information and the display settings for displaying the subset of the returned information (Operation 512). The database side generates an output SDO indicating at least a subset of the returned information and the display settings for displaying the subset of the returned information. Examples of operations for generating an output SDO are described below with reference to FIGS. 6A-6C.

One or more embodiments include transmitting the output SDO to the particular endpoint of the API (Operation 514). The database side transmits the output SDO to the same API endpoint from which the input SDO was received at Operation 502.

The database side performs the operations of FIG. 5 for generating an output SDO responsive to each input SDO received, even if the input SDOs indicate bot queries of different intents. The database side performs the operations of FIG. 5 for generating an output SDO responsive to each input SDO received, even if the input SDO triggers execution of different routines, and thereby different database queries. The same API endpoint even if bot queries of different intents and/or different database queries are involved.

6. Applying Various Types of Display Settings

Figure 6A:
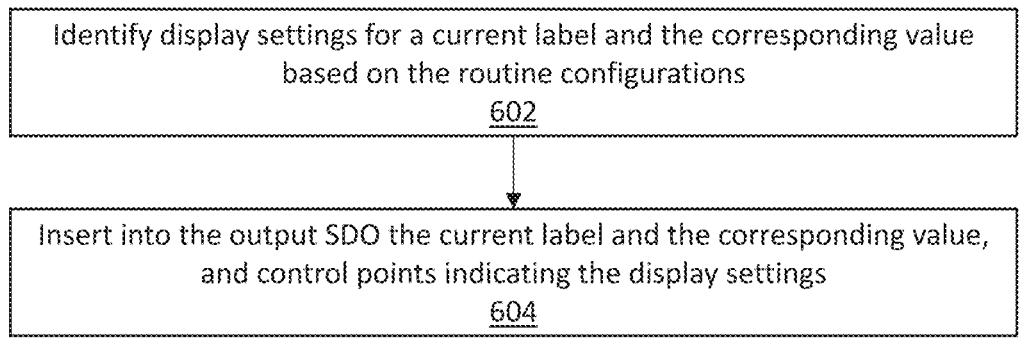
FIG. 6A illustrates an example set of operations for generating an output structured data object (SDO) including control points indicating display settings for displaying a result returned from a database query in accordance with one or more embodiments.
Figure 6B:
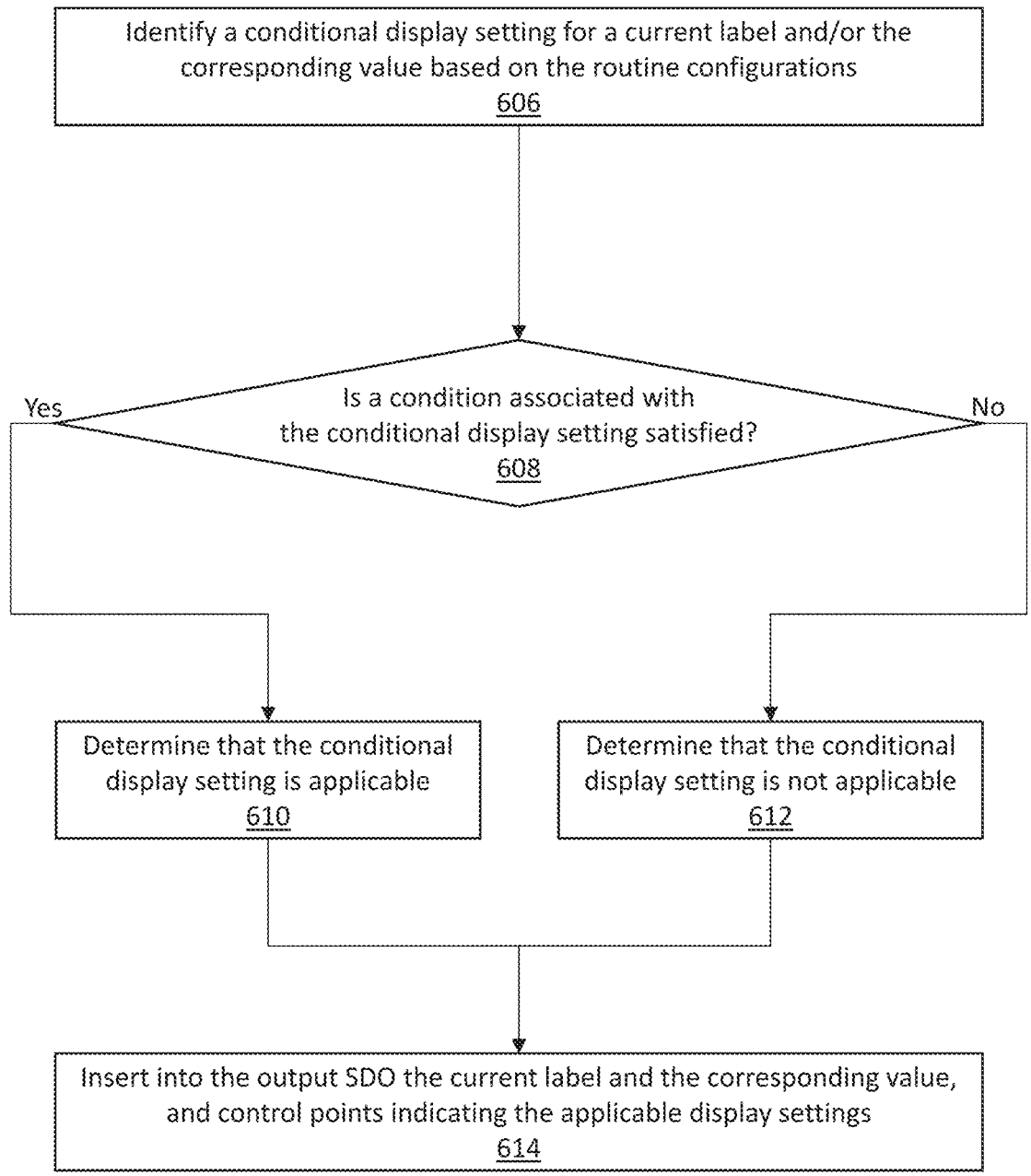
FIG. 6B illustrates an example set of operations for generating an output structured data object (SDO) including control points indicating applicable display settings determined based on evaluation of a condition in accordance with one or more embodiments.
Figure 6C:
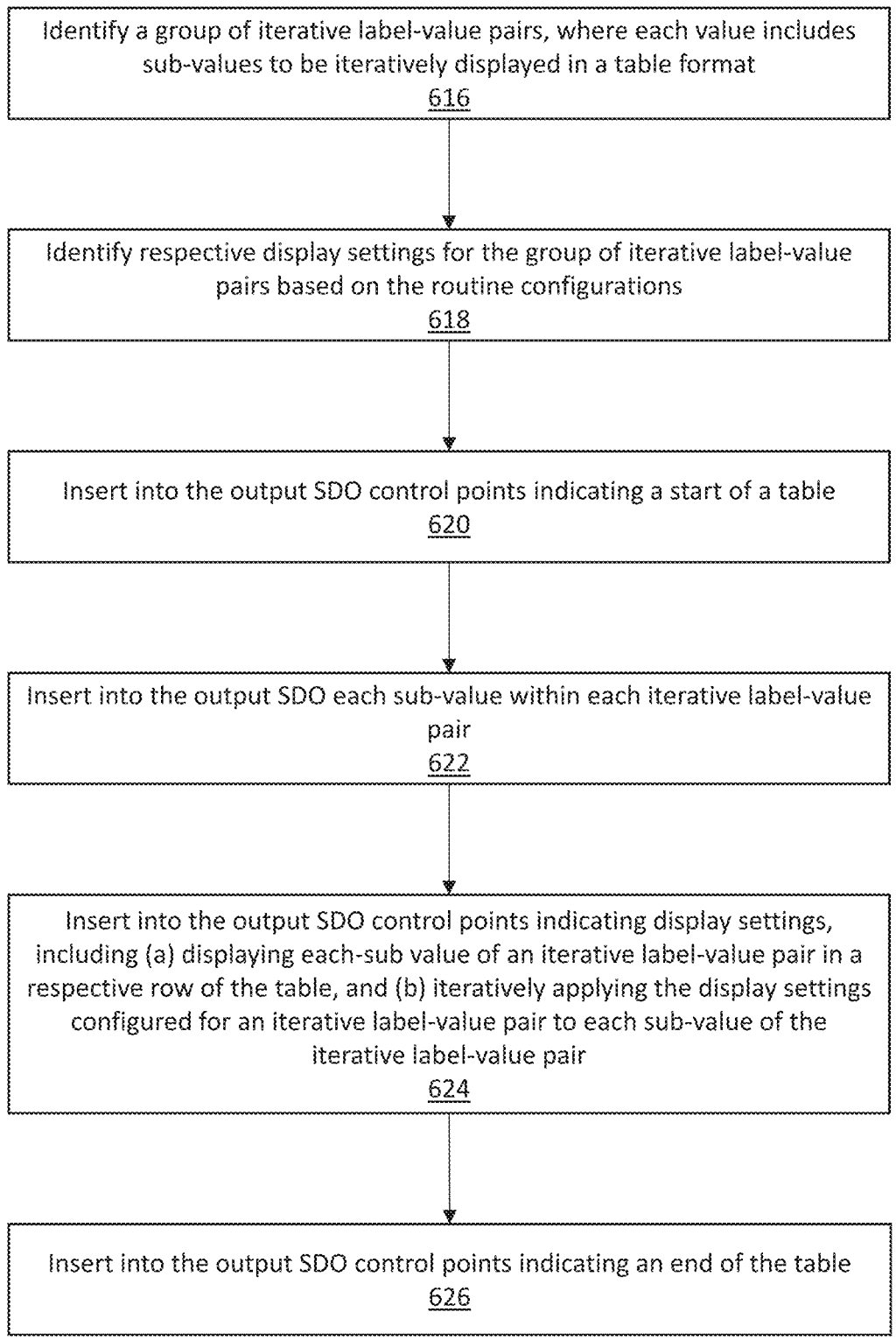
FIG. 6C illustrates an example set of operations for generating an output structured data object (SDO) indicating compacted information returned from a database query in accordance with one or more embodiments.

One or more operations illustrated in FIGS. 6A-6C may be modified, rearranged, or omitted all together. Accordingly, the particular sequence of operations illustrated in FIGS. 6A-6C should not be construed as limiting the scope of one or more embodiments. The database side iterates through each label and value associated with a result returned from a database query. The database side applies operations of FIGS. 6A-6C, as appropriate, to each label and value. The term "current label" refers to the label being processed in a current iteration.

FIG. 6A illustrates an example set of operations for generating an output structured data object (SDO) including control points indicating display settings for displaying a result returned from a database query in accordance with one or more embodiments.

One or more embodiments include identifying display settings for a current label and the corresponding value based on the routine configurations (Operation 602). The database side obtains routine configurations for the routine being executed. The routine configurations indicate display settings for a current label and display settings for a value corresponding to the current label.

One or more embodiments include inserting into the output SDO the current label and the corresponding value, and control points indicating the display settings (Operation 604). The database side inserts, into the output SDO, the current label and the corresponding value. The database side further inserts, into the output SDO, control points associated with the current label indicating the display settings for the current label. The database side further inserts, into the output SDO, control points associated with the corresponding value indicating the display settings for the corresponding value.

In an embodiment, where display settings indicate that a label and/or value is not to be displayed in a bot response, the output SDO may omit the label and/or value. Alternatively, the output SDO may still include the label and/or value, and include a control point indicating that the label and/or value is not to be displayed in a bot response.

FIG. 6B illustrates an example set of operations for generating an output structured data object (SDO) including control points indicating applicable display settings determined based on evaluation of a condition in accordance with one or more embodiments;

One or more embodiments include identifying a conditional display setting for a current label and/or the corresponding value based on the routine configurations (Operation 606). The database side obtains routine configurations for the routine being executed. The routine configurations indicate a conditional display setting for a current label and/or a corresponding value. As an example, routine configurations may indicate a conditional display setting for a value corresponding to a label "Payment Date." The conditional display setting may indicate that a bold format is applied if the value is before "Jan. 1, 2020."

One or more embodiments include determining whether a condition associated with the conditional display setting is satisfied (Operation 608). The database side determines a condition associated with the conditional display setting, as indicated by the routine configurations. The database side evaluates the condition to determine whether the condition is satisfied.

If the condition is satisfied, one or more embodiments include determining that the conditional display setting is applicable (Operation 610). The database side determines that the conditional display setting is applicable.

If the condition is not satisfied, one or more embodiments include determining that the conditional display setting is not applicable (Operation 612). The database side determines that the conditional display setting is not applicable. The routine configurations may optionally indicate an alternative display setting that is applicable when the condition is not satisfied.

One or more embodiments include inserting into the output SDO the current label and the corresponding value, and control points indicating the applicable display settings (Operation 614). The database side inserts, into the output SDO, the current label and the corresponding value. The database side further inserts, into the output SDO, control points associated with the current label indicating the applicable display settings for the current label. The database side further inserts, into the output SDO, control points associated with the corresponding value indicating the applicable display settings for the corresponding value.

FIG. 6C illustrates an example set of operations for generating an output structured data object (SDO) indicating compacted information returned from a database query in accordance with one or more embodiments.

One or more embodiments include identifying a group of iterative label-value pairs, where each value includes sub-values to be iteratively displayed in a table format (Operation 616). The database side obtains routine configurations for the routine being executed. The routine configurations indicate that a group of label-value pairs are iterative. Referring to FIG. 4 above as an example, the labels "Earning Type" and "Earning Type Values" are associated with iterative label-value pairs 402a-402b.

One or more embodiments include identifying respective display settings for the group of iterative label-value pairs based on the routine configurations (Operation 618). The database side identifies a display setting for each label and/or value, in the group of iterative label-value pairs, based on the routine configurations.

One or more embodiments include inserting into the output SDO control points indicating a start of a table (Operation 620). The database side inserts, into the output SDO, control points indicating a start of a table. The information of the group of iterative label-value pairs will be inserted into the table.

One or more embodiments include inserting into the output SDO each sub-value within each iterative label-value pair (Operation 622). The database side inserts, into the output SDO, each sub-value within each iterative label-value pair.

One or more embodiments include inserting into the output SDO control points indicating display settings, including (a) displaying each-sub value of an iterative label-value pair in a respective row of the table, and (b) iteratively applying the display settings configured for an iterative label-value pair to each sub-value of the iterative label-value pair (Operation 624). The database side inserts, into the output SDO, control points indicating displaying each-sub value of an iterative label-value pair in a respective row of the table. Referring again to FIG. 4, each sub-value, "regular earnings" and "bonus," associated with "Earning Types" is inserted into different rows of a table. Each sub-value, "45000" and "10000," associated with "Earning Type Values" is inserted into different rows of the table.

The database side iteratively inserts, into the output SDO, the display settings configured for the value of the iterative label-value pair as the display value for each sub-value of the iterative label-value pair. Referring again to FIG. 4, routine configurations for a routine may include a display setting for the value associated with the iterative label-value pair 402a. The display setting may be a bold format. An output SDO generated based on the routine may indicate that the bold format is applied to each of the sub-values, "regular earnings" and "bonus," associated with the iterative label-value pair 402a.

One or more embodiments include inserting into the output SDO control points indicating an end of the table (Operation 626). The database side inserts, into the output SDO, control points indicating an end of the table.

7. Applying Parent Routine Configurations to a Child Routine

Figure 7:
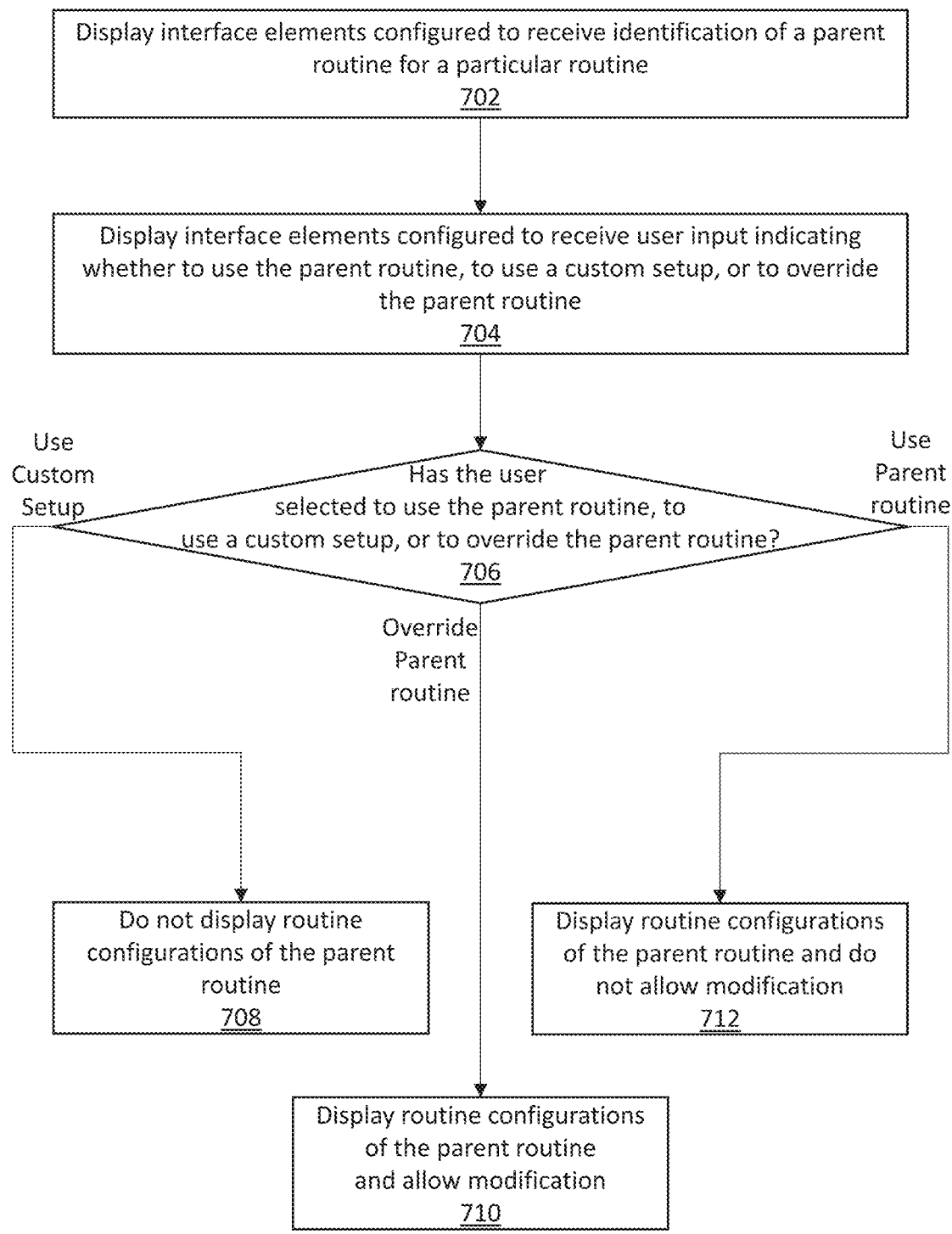
FIG. 7 illustrates an example set of operations for applying parent routine configurations to a child routine in accordance with one or more embodiments.

One or more operations illustrated in FIG. 7 may be modified, rearranged, or omitted all together. Accordingly, the particular sequence of operations illustrated in FIG. 7 should not be construed as limiting the scope of one or more embodiments.

FIG. 7 illustrates an example set of operations for applying parent routine configurations to a child routine in accordance with one or more embodiments.

One or more embodiments include displaying interface elements configured to receive identification of a parent routine for a particular routine (Operation 702). An integrative configuration application module renders a design user interface. The integrative configuration application module displays interface elements configured to receive identification of a parent routine for a particular routine.

In an embodiment, routines are organized into groups, referred to as "bot modules." The integrative configuration application module displays a module profile for a particular bot module. In the module profile, the integrative configuration application module displays an interface element configured to receive identification of a parent bot module for the particular bot module. The routines of the parent bot module are referred to as the "parent routines" of the corresponding routines of the particular bot module. As an example, a banking module may include a balance routine and a deposit routine. A module profile for a US banking module may indicate that the banking module is a parent of the US banking module. Hence, the balance routine of the banking module is a parent of the balance routine of the US banking module. The deposit routine of the banking module is a parent of the deposit routine of the US banking module.

One or more embodiments include displaying interface elements configured to receive user input indicating whether to use the parent routine, to use a custom setup, or to override the parent routine (Operation 704). The integrative configuration application module displays interface elements configured to receive user input indicating whether to use the parent routine, to use a custom setup, or to override the parent routine.

One or more embodiments include determining whether the user has selected to use the parent routine, to use a custom setup, or to override the parent routine (Operation 706). The integrative configuration application module determines whether the user has selected to use the parent routine, to use a custom setup, or to override the parent routine.

If the user has selected to use a custom setup, one or more embodiments include refraining from displaying routine configurations of the parent routine (Operation 708). The integrative configuration application module displays interface elements configured to receive routine configurations for the particular routine. The integrative configuration application module refrains from displaying routine configurations of the parent routine as the routine configurations of the particular routine.

If the user has selected to use the parent routine, one or more embodiments include displaying routine configurations of the parent routine and not allowing modification (Operation 712). The integrative configuration application module displays routine configurations of the parent routine as the routine configurations of the particular routine. The integrative configuration application module prohibits modification of the routine configurations for the particular routine.

In an embodiment, routines are organized into groups, referred to as "bot modules." Where a particular bot module is associated with a parent bot module, the routines of the parent bot module are copied and used as routines of the particular bot module. The routine configurations for each routine of the parent bot module are copied and used as the routine configurations for the corresponding routine of the particular bot module.

If the user has selected to override the parent routine, one or more embodiments include displaying routine configurations of the parent routine and allowing modification (Operation 710). The integrative configuration application module displays routine configurations of the parent routine as the routine configurations of the particular routine. The integrative configuration application module allows modification of the routine configurations for the particular routine.

In an embodiment, routines are organized into groups, referred to as "bot modules." Where a particular bot module is associated with a parent bot module, the routines of the parent bot module are copied and used as routines of the particular bot module. The routine configurations for each routine of the parent bot module are copied and used as the routine configurations for the corresponding routine of the particular bot module. The design user may delete routines or add routines to the particular bot module. The design user may modify the routine configurations for any routines of the particular bot module.

8. Rendering One or More User Interfaces Configured to Receive Routine Configurations One or more operations illustrated in FIG. 8 may be modified, rearranged, or omitted all together. Accordingly, the particular sequence of operations illustrated in FIG. 8 should not be construed as limiting the scope of one or more embodiments.

Figure 8:
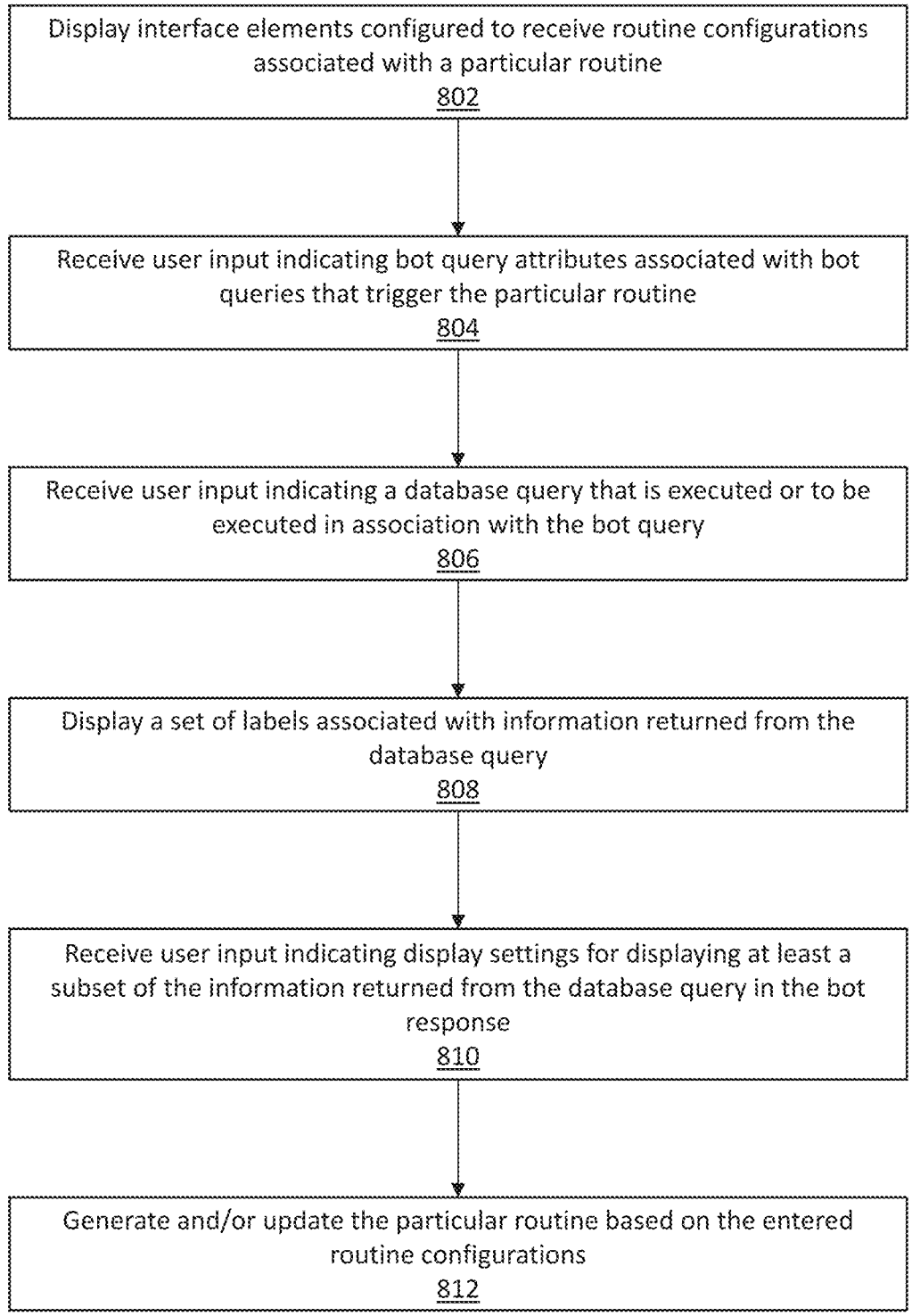
FIG. 8 illustrates an example set of operations for rendering one or more user interfaces configured to receive routine configurations in accordance with one or more embodiments.

FIG. 8 illustrates an example set of operations for rendering one or more user interfaces configured to receive routine configurations in accordance with one or more embodiments.

One or more embodiments include displaying interface elements configured to receive routine configurations associated with a particular routine (Operation 802). An integrative configuration application module renders a design user interface. The integrative configuration application module displays interface elements configured to receive routine configurations associated with a particular routine. The interface elements include interface elements configured to receive bot query attributes associated with bot queries that trigger the particular routine. The interface elements include interface elements configured to receive a database query executed or to be executed in association with the particular routine. The interface elements include interface elements configured to receive display settings for displaying results returned from the database query in a bot response.

One or more embodiments include receiving user input indicating bot query attributes associated with bot queries that trigger the particular routine (Operation 804). The integrative configuration application module receives user input indicating bot query attributes associated with bot queries that trigger the particular routine. As an example, a design user may determine that a particular routine should be triggered by bot queries associated with the intent "balance inquiry" and originating from the United States. The design user may enter into the design interface bot query attributes for the particular routine. The bot query attributes may include "balance inquiry intent" and "United States origin."

One or more embodiments include receiving user input indicating a database query that is executed or to be executed in association with the bot query (Operation 806). The integrative configuration application module receives user input indicating a database query that is executed or to be executed in association with the bot query.

In an embodiment, the integrative configuration application module displays an interface element configured to receive a database query or a database view associated with the particular routine. The integrative configuration application module may receive user input indicating a database query that is executed or to be executed in association with the bot query. Alternatively, the integrative configuration application module may receive user input indicating a database view that is associated with the bot query.

One or more embodiments include displaying a set of labels associated with information returned from the database query (Operation 808). The integrative configuration application module determines a set of labels associated with information returned from the database query specified at Operation 806. Alternatively, the integrative configuration application module determines a set of labels associated with information returned from the database view specified at Operation 806. The set of labels may be concurrently displayed on a design user interface.

One or more embodiments include receiving user input indicating display settings for displaying at least a subset of the information returned from the database query in the bot response (Operation 810). The integrative configuration application module displays interface elements configured to receive display settings for each label displayed at Operation 808, and for each corresponding value. The interface elements for the display settings for multiple labels and corresponding values may be concurrently displayed on a design user interface.

One or more embodiments include generating and/or updating the particular routine based on the entered routine configurations (Operation 812). If the particular routine is being created, the integrative configuration application module generates the particular routine based on the entered routine configurations. If the particular routine is already created and is being modified, the integrative configuration application module updates the particular routine based on the entered routine configurations.

In one or more embodiments, the integrative configuration application module concurrently displays, on a design user interface, at least two of:
 (a) an interface element configured to receive user input indicating query attributes associated with bot queries that triggers the particular routine;
 (b) an interface element configured to receive user input indicating a database query that is executed or to be executed for particular routine; and
 (c) an interface element configured to receive user input indicating display settings for displaying information returned from the database query.

In one or more embodiments, the integrative configuration application module displays a separate design user interface for each of:
 (a) an interface element configured to receive user input indicating query attributes associated with bot queries that triggers the particular routine;
 (b) an interface element configured to receive user input indicating a database query that is executed or to be executed for particular routine; and
 (c) an interface element configured to receive user input indicating display settings for displaying information returned from the database query.

The integrative configuration application module further displays, on each design user interface, a navigation button configured to navigate through the design user interfaces. The navigation button may be labeled with text, such as, "Next." As an example, an integrative configuration application module may first render a design user interface displaying an interface element configured to receive user input indicating query attributes associated with bot queries that triggers the particular routine. Responsive to selection of the navigation button, the integrative configuration application module renders another design user interface that displays an interface element configured to receive user input indicating a database query that is executed or to be executed for particular routine. Responsive to another selection of the navigation button, the integrative configuration application module renders another design user interface that displays an interface element configured to receive user input indicating display settings for displaying information returned from the database query.

In one or more embodiments, the integrative configuration application module concurrently displays, on a design user interface, multiple tabs. A first tab corresponds to bot query attributes; a second tab corresponds to database query; and a third tab corresponds to display settings. When the first tab is selected, an interface element configured to receive user input indicating query attributes associated with bot queries that triggers the particular routine is displayed. When the second tab is selected, an interface element configured to receive user input indicating a database query that is executed or to be executed for particular routine is displayed. When the third tab is selected, an interface element configured to receive user input indicating display settings for displaying information returned from the database query is displayed.

9. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 9:
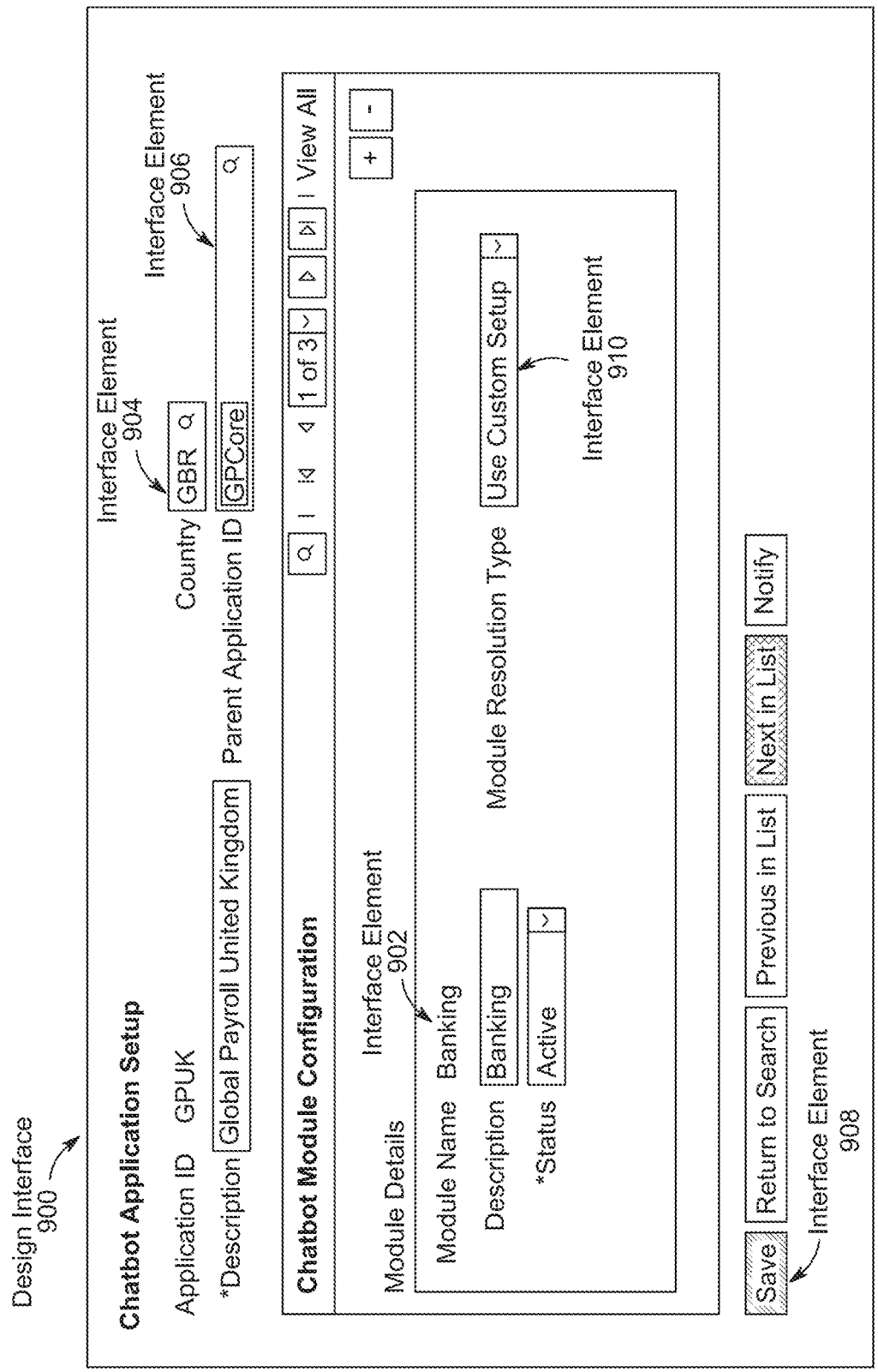
FIG. 9 illustrates an example user interface for setting a module profile for a bot module in accordance with one or more embodiments.

FIG. 9 illustrates an example user interface 900 for setting a module profile for a particular bot module in accordance with one or more embodiments. Interface element 902 indicates a module name for the particular bot module. As illustrated, the module name is "Banking."

Interface element 904 is configured to receive a country associated with the particular bot module. As illustrated, the country entered for the particular bot module is "GBR," representing Great Britain. The country for the bot module implicates a particular bot query attribute for routines of the bot module; the particular bot query attribute is a query source of Great Britain. Hence, bot queries must originate from the country of Great Britain (and have other matching bot query attributes) in order to trigger a routine of the particular bot module. The originating country of a bot query may be determined based on an Internet Protocol (IP) address and/or other methods.

Interface element 906 is configured to receive a parent bot module for the particular bot module. A user may click the magnifying glasses icon of interface element 906 to search through a list of existing bot modules, and select one bot module as a parent bot module. As illustrated, a parent bot module with the identifier "GPCore" has been selected as a parent bot module for the particular bot module.

Interface element 910 is configured to receive a user selection to use the parent bot module, to use a custom setup, or to override the parent bot module. If use the parent bot module is selected, the routines of the parent bot module GPCore are copied and used as routines of the particular bot module. The routines for the particular bot module are not modifiable. If override the parent bot module is selected, the routines of the parent bot module GPCore are copied and used as routines of the particular bot module. The routines for the particular bot module are modifiable. If use a custom setup is selected, the routines of the parent bot module are not used as the routines for the particular bot module. The particular bot module may initially have zero routines. As illustrated, "Use a Custom Setup" has been selected.

Interface element 908 is configured to receive a user request to save the user inputs to the module profile. After interface element 908 is selected, interface 1000 of FIG. 10 may be displayed.

FIG. 10 illustrates an example user interface 1000 for setting routines of a particular bot module in accordance with one or more embodiments. Interface element 1002 indicates a module name for the particular bot module. As illustrated, the module name is "Banking."

Various routines of the parent bot module have been copied and used as routines for the particular bot module. As illustrated, the routines 1004 for the particular bot module are associated with identifiers, "EditBankAcct," "ViewBankAcct," "ViewPayDist," and "MaskAcctNo," respectively. Each routine is associated with a description, action type, parent identifier, and method name. Each routine is associated with an option to enter routine configurations for the routine. As illustrated, interface element 1006 may be selected to enter routine configurations for the "ViewBankAcct" routine. After interface element 1006 is selected, interface 1100 of FIG. 11 may be displayed.

FIG. 11 illustrates an example user interface 1100 for configuring a particular routine in accordance with one or more embodiments. Interface element 1102 is configured to receive a layout type associated with the particular routine. As illustrated, the layout type entered is "Card." Hence, the information elements associated with the particular routine would be displayed in a Card layout in a bot response.

Interface element 1104 is configured to receive a source type, such as a database query or a database view. As illustrated, the source type entered is "View," representing database view. Interface element 1105 is configured to receive a view name. The view name specifies the specific database view to be used in association with the particular routine.

Interface element 1106 is configured to receive a layout for the Card layout. As illustrated, the layout entered is "Horizontal." Hence, the information elements associated with the particular routine would be displayed in a Horizontal Card layout in a bot response.

Interface element 1008 is configured to receive a source for a bot message. Possible sources for bot messages include various message catalogs or libraries. Interface element 1110 is configured to receive a bot message number. As illustrated, the bot message entered is "Message Catalog." The bot message number is "2." Hence, a bot message associated with identifier "2" within the "Message Catalog" would be displayed in a bot response.

Interface elements 1112 are configured to receive user selection of a tab. The tabs include "Data source," "Conditions," and "Display Options." Under the "Data Source" tab, each label associated with the source (results from database query and/or database view) specified at interface elements 1104-1105 is displayed. The labels are displayed responsive to the selection of the source at interface elements 1104-1105. Interface elements 1114-1124 are displayed in association with the labels. Further details regarding the "Data Source" tab are described with reference to FIG. 12. Further details regarding the "Conditions" tab are described with reference to FIG. 13. Further details regarding the "Display Options" tab are described with reference to FIG. 14.

Figure 12:
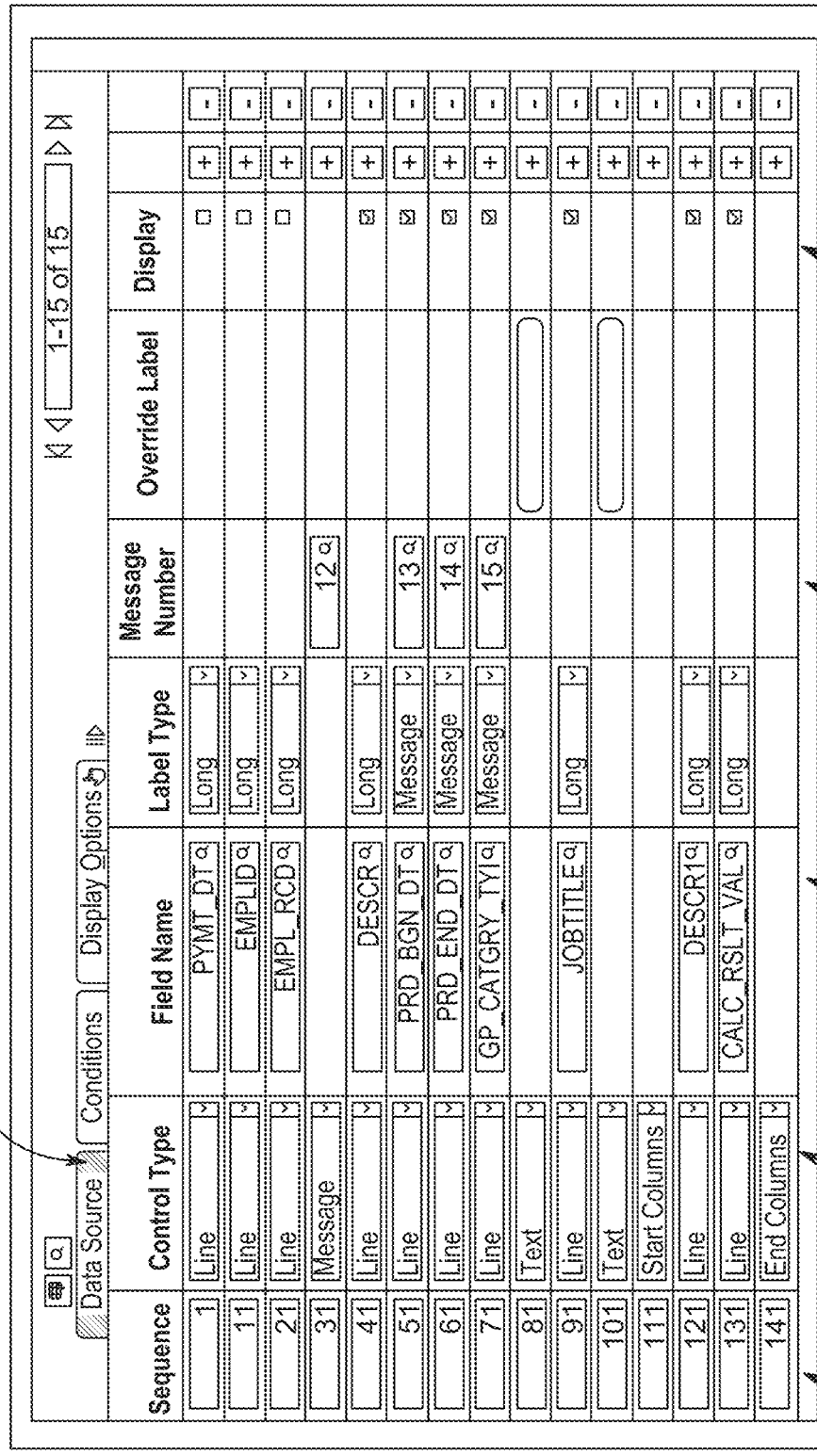
FIG. 12 illustrates an example user interface for configuring a routine in accordance with one or more embodiments.

FIG. 12 illustrates an example user interface 1200 for configuring a particular routine in accordance with one or more embodiments. As illustrated, interface element 1202 for the "Data Source" tab is selected. A list of elements associated with a bot response are shown. The list of elements includes labels associated with a database query and/or database view of the particular routine. The labels include, for example, "PYMT_DT," "EMPLID," "EMPL_RCD," "DESCR," "PRD_BGN_DT," "PRD_END_DT," "GP_CATGRY_TYI," "JOBTITLE." Additional elements may be added by a design user. Additional elements include, for example, natural language messages that are not part of the information obtained from the database query and/or database view. Additional elements may also include, for example, table layout settings for displaying the information obtained from the database query and/or database view.

Interface elements 1214 are configured to receive sequence configurations for the list of elements. The sequence configuration indicates the sequence for displaying the elements in a bot response. As illustrated, the label "PYMT_DT" is associated with sequence 1. The label "EMPLID" is associated with sequence 11. The label "EMPL_RCD" is associated with sequence 21. A message, with an identifier of "12" is associated with sequence 31.

Interface elements 1216 are configured to receive control types for the list of elements. Labels associated with the database query and/or database view have a control type of "Line." Natural language messages have a control type of "Message." Table layout settings have a control type relating to rows, columns, and/or tables, such as "Start Columns" and "End Columns."

Interface elements 1218 are configured to receive field names of labels associated with the database query and/or database view. Field names are not relevant to natural language messages or table layout settings. As illustrated, the field name of the first label is "PYMT_DT." As illustrated, the field name of the second label is "EMPLID." As described above, the field name may be auto-populated based on a design user's selection of the database query and/or database view at interface elements 1104-1105 of FIG. 11.

Interface elements 1222 are configured to receive message numbers (or identifiers) of natural language messages included in the elements of a bot response. The message to be displayed in a bot response is retrieved from a catalog or library based on the indicated message identifier. Message identifiers are not relevant to the labels associated with the database query and/or database view. As illustrated, the message at sequence 31 is associated with an identifier of "12."

Interface elements 1224 are configured to receive indications of whether to display, in a bot response, the labels and/or corresponding values associated with the database query and/or database view. The interface elements 1224 are checkboxes, wherein a check indicates that the label and/or the corresponding value is to be displayed. As illustrated, the labels "PYMT_DT," "EMPLID," "EMPL_RCD," and corresponding values are not to be displayed. Meanwhile, the labels "DESCR," "PRD_BGN_DT," "PRD_END_DT," "GP_CATGRY_TYI" and/or corresponding values are to be displayed.

Figure 13:
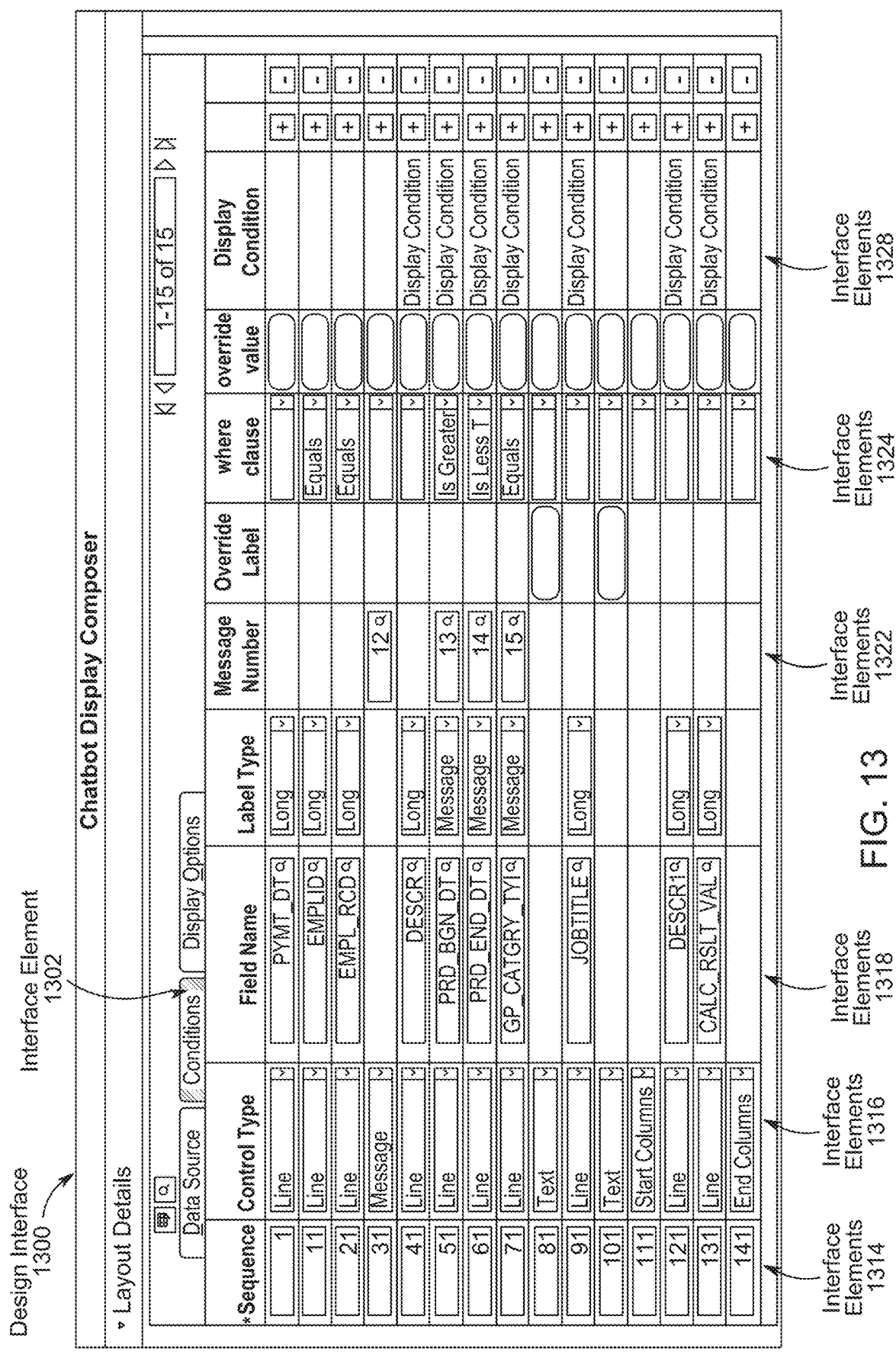
FIG. 13 illustrates an example user interface for configuring conditional display settings for a routine in accordance with one or more embodiments.

FIG. 13 illustrates an example user interface 1300 for configuring conditional display settings for a routine in accordance with one or more embodiments. As illustrated, interface element 1202 for the "Conditions" tab is selected. The same list of elements associated with a bot response (same as the elements under the "Data Source" tab) are shown.

Interface elements 1314 are similar to interface elements 1214. Interface elements 1314 are configured to receive sequence configurations for the list of elements.

Interface elements 1316 are similar to interface elements 1216. Interface elements 1316 are configured to receive control types for the list of elements.

Interface elements 1318 are similar to interface elements 1218. Interface elements 1318 are configured to receive field names of labels associated with the database query and/or database view.

Interface elements 1322 are similar to interface elements 1222. Interface elements 1322 are configured to receive message numbers (or identifiers) of natural language messages included in the elements of a bot response.

Interface elements 1324-1328 are unique to the "Conditions" tab. Interface elements 1324-1328 are configured to receive information associated with conditional display settings for one or more labels and corresponding values.

Interface elements 1324 are configured to receive "where clause" statements. A "where clause" statement indicates an operator to be used in a condition associated with a conditional display setting. "Where clause" statements may be, for example, "equals," "greater than or equal to," "greater than," "less than or equal to," and "less than."

Interface elements 1328 are configured to receive display conditions. A display condition indicates a value to be used in association with the operator indicated at an interface element 1324. As illustrated, a conditional display condition is associated with the field name "PRD_BGN_DT." The where clause is "greater than or equal to." The display condition may be a particular date, such as "Oct. 1, 2020." Hence, the conditional display setting is applicable to the "PRD_BGN_DT" label and corresponding value, if the value is greater than or equal to Oct. 1, 2020.

FIG. 14 illustrates an example user interface 1400 for configuring detailed display settings for a routine in accordance with one or more embodiments. As illustrated, interface element 1402 for the "Display Options" tab is selected. The same list of elements associated with a bot response (same as the elements under the "Data Source" tab) are shown.

Interface elements 1414 are similar to interface elements 1214. Interface elements 1314 are configured to receive sequence configurations for the list of elements.

Interface elements 1416 are similar to interface elements 1216. Interface elements 1316 are configured to receive control types for the list of elements.

Interface elements 1418 are similar to interface elements 1218. Interface elements 1318 are configured to receive field names of labels associated with the database query and/or database view.

Interface elements 1422 are similar to interface elements 1222. Interface elements 1322 are configured to receive message numbers (or identifiers) of natural language messages included in the elements of a bot response.

Interface elements 1424-1434 are unique to the "Display Options" tab. Interface elements 1424-1434 are configured to receive information associated with formats, layouts, and/or iterative label-value pairs.

Interface elements 1424 are configured to receive indications of whether to display, in a bot response, the labels associated with the database query and/or database view. Interface elements 1424 are not relevant to label-value pairs for which the interface elements 1224 were not checked. As illustrated, the interface element 1424 for the "DESCR" label is not checked; hence the "DESCR" label is not to be displayed. The interface elements 1424 for the "PRD_BGN_DT," "PRD_END_DT," "GP_CATGRY_TYI" labels are not checked; hence "PRD_BGN_DT," "PRD_END_DT," "GP_CATGRY_TYI" labels are to be displayed.

Interface elements 1426 are configured to receive indications of whether to display, in a bot response, the labels associated with the database query and/or database view in bold. Interface elements 1426 are not relevant to labels for which the interface elements 1424 were not checked. As illustrated, the interface elements 1426 for the "PRD_BGN_DT," "PRD_END_DT," "GP_CATGRY_TYI" labels are not checked; hence the "PRD_BGN_DT," "PRD_END_DT," "GP_CATGRY_TYI" labels are to be displayed without a bold format.

The interface element 1426 for the "JOBTITLE" label is checked; hence the "JOBTITLE" label is to be displayed in bold.

Interface elements 1428 are configured to receive indications of whether to display, in a bot response, the values associated with the database query and/or database view. Interface elements 1428 are not relevant to label-value pairs for which the interface elements 1224 were not checked. As illustrated, the interface element 1428 for the values corresponding to the "DESCR," "PRD_BGN_DT," "PRD_END_DT" labels are checked; hence the values corresponding to the "DESCR," "PRD_BGN_DT," "PRD_END_DT" labels are to be displayed. The interface element 1428 for the value corresponding to the "GP_CATGRY_TYI" label is not checked; hence the value corresponding to the "GP_CATGRY_TYI" label is not to be displayed.

Interface elements 1430 are configured to receive indications of whether to display, in a bot response, the values associated with the database query and/or database view in bold. Interface elements 1430 are not relevant to values for which the interface elements 1428 were not checked. As illustrated, the interface elements 1430 for the value corresponding to the "DESCR" label is not checked; hence the value corresponding to the "DESCR" label is to be displayed without a bold format. The interface elements 1430 for the values corresponding to the "PRD_BGN_DT," "PRD_END_DT" labels are checked; hence the values corresponding to the "PRD_BGN_DT," "PRD_END_DT" labels are to be displayed in bold.

Interface elements 1432 are configured to receive indications of whether the label-value pairs are iterative. As illustrated, the interface elements 1432 for the "DESCR1" and "CALC_RST_VAL" labels (associated with sequences 121 and 131) are checked; hence the associated label-value pairs are iterative. The selection of interface elements 1432 indicates that the value for the "DESCR1" label includes multiple sub-values, and the value for the "CALC_RST_VAL" label includes multiple sub-values. The "Start Column" and "End Column" elements (associated with sequences 111 and 141) indicate that the sub-values of the "DESCR" and "CALC_RST_VAL" labels are to be displayed in table layout.

Interface elements 1434 are configured to receive indications of whether to start a new line after displaying the label and/or corresponding value. If the interface element 1434 for a particular label-value pair is checked, then the bot response should display the label and/or corresponding value of the particular label-value pair, start a new line, then display the label and/or corresponding value of the next label-value pair. If the interface element 1434 for a particular label-value pair is not checked, then the bot response should display the label and/or corresponding value of the particular label-value pair, and then display (in the same line) the label and/or corresponding value of the next label-value pair. As illustrated, the interface elements 1434 for the "PRD_BGN_DT" and "PRD_END_DT" labels are not checked; hence the "PRD_BGN_DT" and "PRD_END_DT" labels and corresponding values are displayed in the same line of a bot response. The interface element 1434 for the "GP_CATGRY_TYI" label is checked; hence the "GP_CATGRY_TYI" label and the "JOBTITLE" label are to be displayed on different lines of the bot response.

As previously indicated, the "DESCR1" and "CALC_RST_VAL" labels are associated with iterative label-value pairs. The interface element 1434 for the "DESCR1" label is not checked, while the interface element 1434 for the "CALC_RST_VAL" label is checked. Hence a sub-value associated with the "DESCR1" label and a sub-value associated with the "CALC_RST_VAL" label are to be displayed on the same line. Then a new line begins. Then the next sub-value associated with the "DESCR1" label and the next sub-value associated with the "CALC_RST_VAL" label are to be displayed on the same line. In a table layout, a sub-value associated with the "DESCR1" label and a sub-value associated with the "CALC_RST_VAL" label are to be displayed in the same row of a table. Then the next sub-value associated with the "DESCR1" label and the next sub-value associated with the "CALC_RST_VAL" label are to be displayed in the next row of the table.

Figure 15:
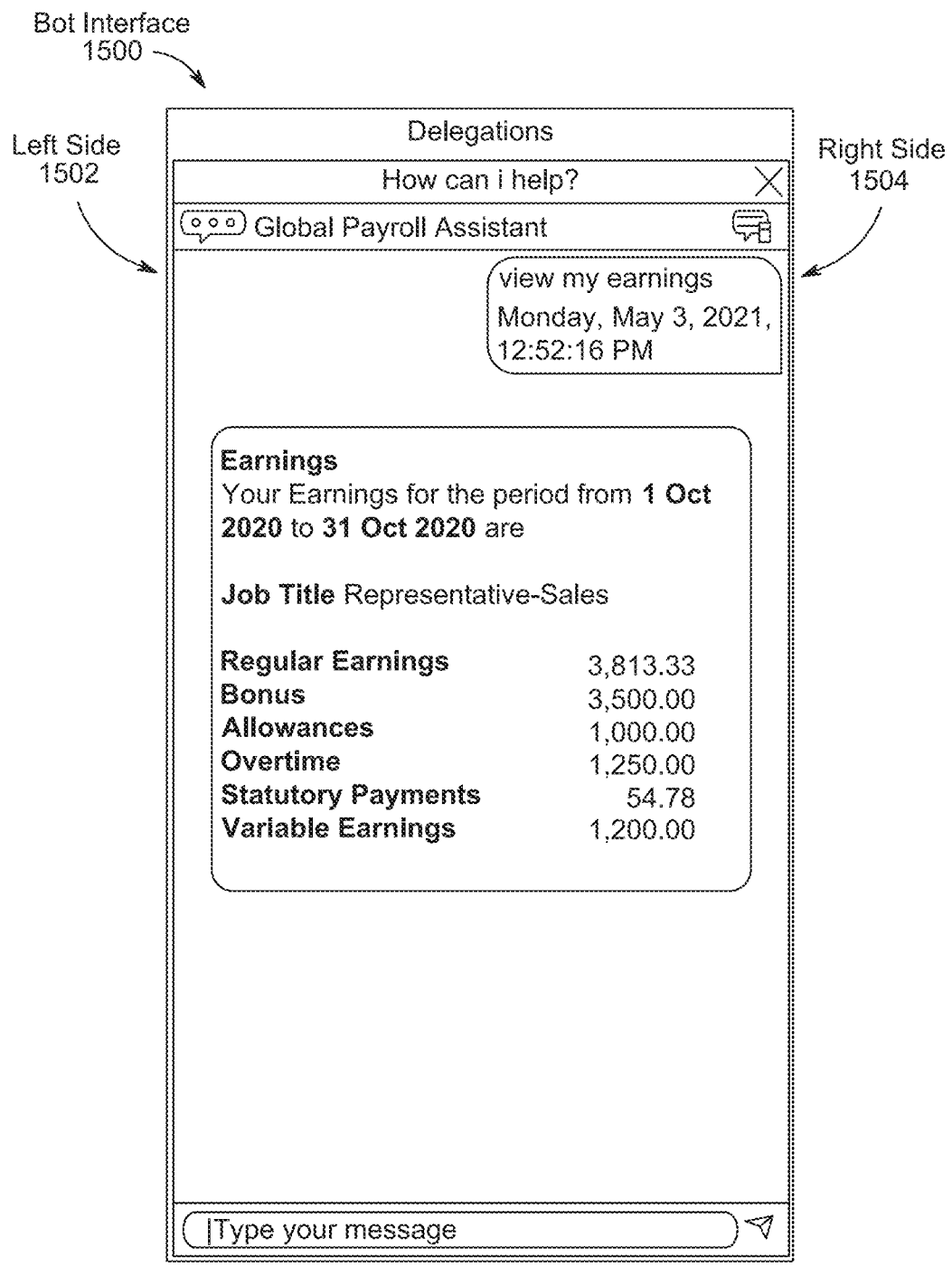
FIG. 15 illustrates an example bot interface rendered based on an output structured data object (SDO) generated by a routine for in accordance with one or more embodiments.

FIG. 15 illustrates an example bot interface 1500 rendered based on an output structured data object (SDO) generated by a particular routine for in accordance with one or more embodiments. A right side 1504 of the bot interface 1500 displays text bubbles for messages from an end user. A left side 1502 of the bot interface 1500 displays text bubbles for messages from a bot application. The display settings for the particular routine are indicated in FIGS. 12-14.

Based on interface elements 1224, the display settings indicate that the "PYMT_DT," "EMPLID," EMPL_RCD" labels and corresponding values are not to be displayed in a bot response, even though the labels and corresponding values are included in the database view associated with the particular routine. As illustrated, bot interface 1500 does not show the "PYMT_DT," "EMPLID," EMPL_RCD" labels and corresponding values.

Based on interface element 1222, the display settings indicate that a message having the identifier "12" is to be displayed. A message catalog stores a set of messages, wherein message #12 is "Your Earnings for the period from [DATE] to [DATE] are." Further based on interface elements 1430, the display settings indicate that the values corresponding to the "PRD_BGN_DT" and "PRD_END_DT" labels are to be displayed in bold. As illustrated, bot interface 1500 shows the message, "Your Earnings for the period from 1 Oct. 2020 to 31 Oct. 2020 are," wherein the two dates are in bold.

Based on interface elements 1426 and 1430, the display settings indicate that the "JOBTITLE" label is to be displayed in bold, and the corresponding value is to be displayed not in bold. As illustrated, bot interface 1500 shows "Job Title" in bold and "Representative-Sales" not in bold.

Based on the "Start Columns" and "End Columns" elements, and the interface elements 1432-1434, the display settings indicate the sub-values associated with the "DESCRI1" and "CALC_RSLT_VAL" labels are to be displayed in respective rows of a table. Further based on interface elements 1430, the display settings indicate that the sub-values associated with the "DESCRI1" label are to be displayed in bold, while the sub-values associated with the "CALC_RSLT_VAL" label are to be displayed not in bold. Further based on interface elements 1434, the display settings indicate that a sub-value associated with the "DESCRI1" label and a sub-value associated with the "CALC_RSLT_VAL" label are to be displayed on the same row of the table, while the next sub-value associated with the "DESCRI1" label and the next sub-value associated with the "CALC_RSLT_VAL" label are to be displayed on the same row of the table.

The sub-values associated with the "DESCRI1" label may include "Regular Earnings," "Bonus," "Allowance," "Overtime," "Statutory Payments," "Variable Earnings." The sub-values associated with the "CALC_RSLT_VAL" label may include "3813.33," "3500.00," "1000.00," "1250.00," "54.78," and "1200.00."

As illustrated, bot interface 1500 shows a first sub-value ("Regular Earnings") associated with the "DESCRI1" label and a first sub-value ("3813.33") associated with the "CALC_RSLT_VAL" label in a first row of a table. Bot interface 1500 shows a next sub-value ("Bonus") associated with the "DESCRI1" label and a next sub-value ("3500.00") associated with the "CALC_RSLT_VAL" label in a second row of the table. Bot interface 1500 shows a next sub-value ("Allowance") associated with the "DESCRI1" label and a next sub-value ("1000.00") associated with the "CALC_RSLT_VAL" label in a third row of the table. Hence bot interface 1500 shows each sub-value associated with the "DESCRI1" and "CALC_RSLT_VAL" labels in respective rows of the table.

Further, bot interface 1500 shows each sub-value associated with the "DESCR1" label in bold. Bot interface 1500 shows each sub-value associated with the "CALC_RSLT_VAL" label not in bold.

10. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 16:
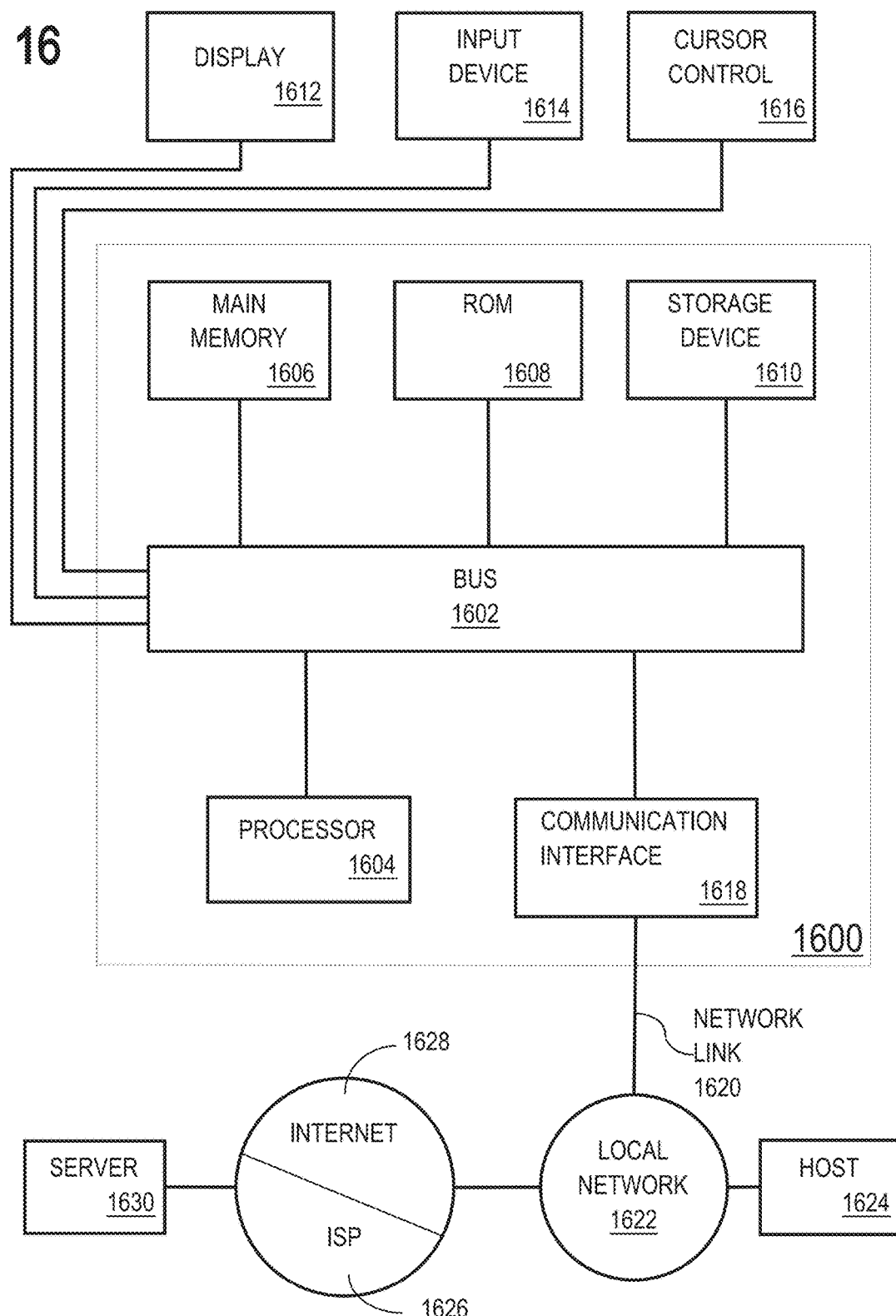
FIG. 16 shows a block diagram that illustrates a computer system in accordance with one or more embodiments.

For example, FIG. 16 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

12. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media comprising computer-executable instructions that, when executed by one or more processors, cause performance of operations, comprising:
   displaying a chatbot configuration interface for mapping query attributes to at least one of a plurality of routines;
   receiving a first set of one or more user inputs via the chatbot configuration interface, wherein the first set of one or more user inputs maps a first routine, of the plurality of routines, to at least a first query attribute;
   storing a first mapping between the first routine and the first query attribute;
   configuring, based on the first mapping, a database system to:
   receive, from an endpoint of an application programming interface (API), input structured data objects comprising query request associated with the first query attribute,
   access the first mapping based on the query requests being associated with the first query attribute,
   select the first routine from the plurality of routines based on the first routine being mapped to the first query attribute by the first mapping, and
   execute the first routine, wherein the first routine comprises:
   execute a first query upon a first database,
   receive information in response to the first query,
   generate an output structured data object comprising the information returned from the first query, and
   transmit the output structure data object to the endpoint of the API;
   wherein the database system receives a first query request associated with the first query attribute, and
   wherein, based on the first query request being associated with the first query attribute and the first routine being mapped to the first query attribute, the database system selects the first routine from the plurality of routines and executes the first routine.

2. The one or more non-transitory computer-readable media of claim 1, wherein the operations further comprise:
   receiving a second set of one or more user inputs via the chatbot configuration interface, wherein the second set of one or more user inputs maps the first routine to at least a first display setting of a plurality of display settings;
   storing a second mapping between the first display setting and the first routine;
   configuring, based on the second mapping, the database system to select the first display setting from the plurality of display settings for configuring query results obtained by executing queries associated with the first query attribute;
   wherein the database system selects the first display setting, based at least in part on the first routine being associated with the first display setting, for configuring a first query result received in response to executing the first query, and wherein the database system transmits the first query result and the first display setting to a chatbot system.

3. The one or more non-transitory computer-readable media of claim 1, wherein the operations further comprise:
   receiving a second set of one or more user inputs via the chatbot configuration interface, wherein the second set of one or more user inputs maps a second routine, of the plurality of routines, to at least a first user inquiry attribute and a first database query;
   storing a second mapping between the first user inquiry attribute and the second routine;
   storing a third mapping between the second routine and the first database query;
   configuring, based on the second mapping, the database system to select the second routine for execution at least responsive to receiving routine requests comprising user inquiries corresponding to the first user inquiry attribute;

configuring, based on the third mapping, execution of the second routine to include executing the first database query upon a database;

wherein the database system receives a first user inquiry associated with the first user inquiry attribute, selects the second routine from the plurality of routines based on the second mapping, and executes the first database query upon the database based on the third mapping.

4. The one or more non-transitory computer-readable media of claim 3, wherein the operations further comprise:
receiving a third set of one or more user inputs via the chatbot configuration interface, wherein the third set of one or more user inputs maps the second routine to at least a first display setting of a plurality of display settings;
storing a fourth mapping between the second routine and the first display setting;
configuring, based on the third mapping, execution of the second routine to include selecting the first display setting from the plurality of display settings for configuring query results obtained by executing the first database query upon the database;
wherein the database system receives from a chatbot system, a first routine request comprising a second user inquiry associated with the first user inquiry attribute;
wherein in response to receiving the first routine request, the database system selects the second routine from the plurality of routines based on the second mapping, executes the first database query upon the database based on the third mapping to obtain a first query result, and selects the first display setting based on the fourth mapping;
wherein the database system generates a first routine response comprising the first query result and the first display setting; and
wherein the database system transmits the first routine response to the chatbot system.

5. The one or more non-transitory computer-readable media of claim 4, wherein the database system receives the first routine request from the chatbot system via the endpoint of the API, and wherein the database system transmits the first routine response to the chatbot system via the endpoint of the API.

6. The one or more non-transitory computer-readable media of claim 4, wherein the chatbot system receives the first routine response, and wherein in response to receiving the first routine response, the chatbot system generates a bot response comprising the first query result configured according to the first display setting.

7. The one or more non-transitory computer-readable media of claim 4,
wherein the plurality of routines comprises a third routine configured for the database system to select a second display setting from the plurality of display settings for configuring query results obtained by executing the first database query in response to input queries associated with a second user inquiry attribute;
wherein the database system receives a second routine request from the chatbot system comprising a third user inquiry associated with the second user inquiry attribute;
wherein in response to receiving the second routine request, the database system selects the third routine from the plurality of routines, executes the first database query upon the database to obtain a second query result, selects the second display setting, generates a second routine response comprising the second query result and the second display setting, and transmits the second routine response to the chatbot system.

8. The one or more non-transitory computer-readable media of claim 1, wherein the operations further comprise:
receiving a second set of one or more user inputs via the chatbot configuration interface, wherein the second set of one or more user inputs comprises (a) at least a second query attribute mapped to a parent routine and (b) the parent routine mapped to a set of routines, of the plurality of routines;
storing a second mapping between (a) the second query attribute and the parent routine and (b) the parent routine and the set of routines;
configuring, based on the second mapping, the database system to select the parent routine for executing queries associated with the second query attribute;
wherein the database system receives a second query associated with the second query attribute and selects the parent routine for executing the second query based at least in part on the second query being associated with the second query attribute.

9. A method, comprising:
displaying a chatbot configuration interface for mapping query attributes to at least one of a plurality of routines;
receiving a first set of one or more user inputs via the chatbot configuration interface, wherein the first set of one or more user inputs maps a first routine, of the plurality of routines, to at least a first query attribute;
storing a first mapping between the first routine and the first query attribute;
configuring, based on the first mapping, a database system to:
receive, from an endpoint of an application programming interface (API), input structured data objects comprising query request associated with the first query attribute,
access the first mapping based on the query requests being associated with the first query attribute,
select the first routine from the plurality of routines based on the first routine being mapped to the first query attribute by the first mapping, and
execute the first routine, wherein the first routine comprises:
execute a first query upon a first database,
receive information in response to the first query,
generate an output structured data object comprising the information returned from the first query, and
transmit the output structure data object to the endpoint of the API;
wherein the database system receives a first query request associated with the first query attribute, and
wherein, based on the first query request being associated with the first query attribute and the first routine being mapped to the first query attribute, the database system selects the first routine from the plurality of routines and executes the first routine;
wherein the method is performed by at least one device including a hardware processor.

10. The method of claim 9, further comprising:
receiving a second set of one or more user inputs via the chatbot configuration interface, wherein the second set of one or more user inputs maps the first routine to at least a first display setting of a plurality of display settings;
storing a second mapping between the first display setting and the first routine;

configuring, based on the second mapping, the database system to select the first display setting from the plurality of display settings for configuring query results obtained by executing queries associated with the first query attribute;

wherein the database system selects the first display setting, based at least in part on the first routine being associated with the first display setting, for configuring a first query result received in response to executing the first query, and wherein the database system transmits the first query result and the first display setting to a chatbot system.

11. The method of claim 9, further comprising:
receiving a second set of one or more user inputs via the chatbot configuration interface, wherein the second set of one or more user inputs maps a second routine, of the plurality of routines, to at least a first user inquiry attribute and a first database query;
storing a second mapping between the first user inquiry attribute and the second routine;
storing a third mapping between the second routine and the first database query;
configuring, based on the second mapping, the database system to select the second routine for execution at least responsive to receiving routine requests comprising user inquiries corresponding to the first user inquiry attribute;
configuring, based on the third mapping, execution of the second routine to include executing the first database query upon a database;
wherein the database system receives a first user inquiry associated with the first user inquiry attribute, selects the second routine from the plurality of routines based on the second mapping, and executes the first database query upon the database based on the third mapping.

12. The method of claim 11, further comprising:
receiving a third set of one or more user inputs via the chatbot configuration interface, wherein the third set of one or more user inputs maps the second routine to at least a first display setting of a plurality of display settings;
storing a fourth mapping between the second routine and the first display setting;
configuring, based on the third mapping, execution of the second routine to include selecting the first display setting from the plurality of display settings for configuring query results obtained by executing the first database query upon the database;
wherein the database system receives from a chatbot system, a first routine request comprising a second user inquiry associated with the first user inquiry attribute;
wherein in response to receiving the first routine request, the database system selects the second routine from the plurality of routines based on the second mapping, executes the first database query upon the database based on the third mapping to obtain a first query result, and selects the first display setting based on the fourth mapping;
wherein the database system generates a first routine response comprising the first query result and the first display setting; and
wherein the database system transmits the first routine response to the chatbot system.

13. The method of claim 12, wherein the database system receives the first routine request from the chatbot system via the endpoint of the API, and wherein the database system transmits the first routine response to the chatbot system via the endpoint of the API.

14. The method of claim 12, wherein the chatbot system receives the first routine response, and wherein in response to receiving the first routine response, the chatbot system generates a bot response comprising the first query result configured according to the first display setting.

15. The method of claim 12,
wherein the plurality of routines comprises a third routine configured for the database system to select a second display setting from the plurality of display settings for configuring query results obtained by executing the first database query in response to input queries associated with a second user inquiry attribute;
wherein the database system receives a second routine request from the chatbot system comprising a third user inquiry associated with the second user inquiry attribute;
wherein in response to receiving the second routine request, the database system selects the third routine from the plurality of routines, executes the first database query upon the database to obtain a second query result, selects the second display setting, generates a second routine response comprising the second query result and the second display setting, and transmits the second routine response to the chatbot system.

16. The method of claim 9, further comprising:
receiving a second set of one or more user inputs via the chatbot configuration interface, wherein the second set of one or more user inputs comprises (a) at least a second query attribute mapped to a parent routine and (b) the parent routine mapped to a set of routines, of the plurality of routines;
storing a second mapping between (a) the second query attribute and the parent routine and (b) the parent routine and the set of routines;
configuring, based on the second mapping, the database system to select the parent routine for executing queries associated with the second query attribute;
wherein the database system receives a second query associated with the second query attribute and selects the parent routine for executing the second query based at least in part on the second query being associated with the second query attribute.

17. A system, comprising:
at least one hardware processor;
wherein the system is configured to execute operations, using the at least one hardware processor, the operations comprising:
displaying a chatbot configuration interface for mapping query attributes to at least one of a plurality of routines;
receiving a first set of one or more user inputs via the chatbot configuration interface, wherein the first set of one or more user inputs maps a first routine, of the plurality of routines, to at least a first query attribute;
storing a first mapping between the first routine and the first query attribute;
configuring, based on the first mapping, a database system to:
receive, from an endpoint of an application programming interface (API), input structured data objects comprising query request associated with the first query attribute,
access the first mapping based on the query requests being associated with the first query attribute, select the first routine from the plurality of routines based on the first routine being mapped to the first query attribute by the first mapping, and execute the first routine, wherein the first routine comprises:
execute a first query upon a first database,
receive information in response to the first query,
generate an output structured data object comprising the information returned from the first query, and
transmit the output structure data object to the endpoint of the API;

wherein the database system receives a first query request associated with the first query attribute, and wherein, based on the first query request being associated with the first query attribute and the first routine being mapped to the first query attribute, the database system selects the first routine from the plurality of routines and executes the first routine.

18. The system of claim 17, wherein the operations further comprise:

receiving a second set of one or more user inputs via the chatbot configuration interface, wherein the second set of one or more user inputs maps a second routine, of the plurality of routines, to at least a first user inquiry attribute and a first database query;

storing a second mapping between the first user inquiry attribute and the second routine;

storing a third mapping between the second routine and the first database query;

configuring, based on the second mapping, the database system to select the second routine for execution at least responsive to receiving routine requests comprising user inquiries corresponding to the first user inquiry attribute;

configuring, based on the third mapping, execution of the second routine to include executing the first database query upon a database;

wherein the database system receives a first user inquiry associated with the first user inquiry attribute, selects the second routine from the plurality of routines based on the second mapping, and executes the first database query upon the database based on the third mapping.

19. The system of claim 18, wherein the operations further comprise:

receiving a third set of one or more user inputs via the chatbot configuration interface, wherein the third set of one or more user inputs maps the second routine to at least a first display setting of a plurality of display settings;

storing a fourth mapping between the second routine and the first display setting;

configuring, based on the third mapping, execution of the second routine to include selecting the first display setting from the plurality of display settings for configuring query results obtained by executing the first database query upon the database;

wherein the database system receives from a chatbot system, a first routine request comprising a second user inquiry associated with the first user inquiry attribute;

wherein in response to receiving the first routine request, the database system selects the second routine from the plurality of routines based on the second mapping, executes the first database query upon the database based on the third mapping to obtain a first query result, and selects the first display setting based on the fourth mapping;

wherein the database system generates a first routine response comprising the first query result and the first display setting; and wherein the database system transmits the first routine response to the chatbot system.

20. The system of claim 19, wherein the operations further comprise:

wherein the plurality of routines comprises a third routine configured for the database system to select a second display setting from the plurality of display settings for configuring query results obtained by executing the first database query in response to input queries associated with a second user inquiry attribute;

wherein the database system receives a second routine request from the chatbot system comprising a third user inquiry associated with the second user inquiry attribute;

wherein in response to receiving the second routine request, the database system selects the third routine from the plurality of routines, executes the first database query upon the database to obtain a second query result, selects the second display setting, generates a second routine response comprising the second query result and the second display setting, and transmits the second routine response to the chatbot system.

* * * * *

UNITED STATES PATENT AND TRADEMARK OFFICE
CERTIFICATE OF CORRECTION

PATENT NO. : 12,254,006 B2
APPLICATION NO. : 18/431812
DATED : March 18, 2025
INVENTOR(S) : Kumar et al.

Page 1 of 1

It is certified that error appears in the above-identified patent and that said Letters Patent is hereby corrected as shown below:

On the Title Page

Column 2, under item (57) abstract, Line 5, delete "(2)" and insert -- (b) --, therefor.

Column 2, under item (57) abstract, Line 6, delete "(3)" and insert -- (c) --, therefor.

In the Specification

In Column 6, Line 27, delete "crate," and insert -- create, --, therefor.

In Column 13, Line 4, delete "an a" and insert -- a --, therefor.

In Column 13, Line 45, delete "an/or" and insert -- and/or --, therefor.

In Column 17, Line 3, delete "embodiments;" and insert -- embodiments. --, therefor.

Signed and Sealed this
Third Day of June, 2025

Coke Morgan Stewart
*Acting Director of the United States Patent and Trademark Office*